(12) United States Patent
Nakai

(10) Patent No.: US 8,368,818 B2
(45) Date of Patent: Feb. 5, 2013

(54) CONTENTS READ-AHEAD CONTROL DEVICE AND READ-AHEAD CONTROL METHOD

(75) Inventor: Kentaro Nakai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/145,159

(22) PCT Filed: Nov. 26, 2010

(86) PCT No.: PCT/JP2010/006904
§ 371 (c)(1),
(2), (4) Date: Jul. 19, 2011

(87) PCT Pub. No.: WO2011/077642
PCT Pub. Date: Jun. 30, 2011

(65) Prior Publication Data
US 2012/0257120 A1    Oct. 11, 2012

(30) Foreign Application Priority Data
Dec. 22, 2009    (JP) .................................. 2009-291122

(51) Int. Cl.
*H04N 5/50* (2006.01)
*H04N 5/44* (2006.01)
(52) U.S. Cl. ......................................... 348/731; 348/725
(58) Field of Classification Search ............... 348/725, 348/731–733; 725/44–47, 100, 131, 134, 725/139, 142, 151; H04N 5/44, 5/50
See application file for complete search history.

(56) References Cited

U.S. PATENT DOCUMENTS

2008/0216116 A1* 9/2008 Pekonen et al. ................. 725/39
2009/0279872 A1* 11/2009 Umemoto et al. ............. 386/124

FOREIGN PATENT DOCUMENTS

| JP | 11-32310 | 2/1999 |
| JP | 2000-101467 | 4/2000 |
| JP | 2005-130087 | 5/2005 |
| JP | 2005-341334 | 12/2005 |
| JP | 2007-235788 | 9/2007 |
| JP | 2008-206039 | 9/2008 |
| JP | 2009-71470 | 4/2009 |
| WO | 2009/072185 | 6/2009 |

OTHER PUBLICATIONS

International Search Report issued Mar. 1, 2011 in corresponding International Application No. PCT/JP2010/006904.

* cited by examiner

*Primary Examiner* — Sherrie Hsia
(74) *Attorney, Agent, or Firm* — Wenderoth, Lind & Ponack, L.L.P.

(57) ABSTRACT

While a user is viewing a video content, a channel zapping operation prediction section (203) predicts a channel zapping operation that will be conducted next by the user based on a history of channel zapping operations by the user. A viewing target prediction section (205) refers to a contents map that is retained by a contents map retain section (204) and that describes contents in a sequential order in which the contents are switched based on a user operation information (121), and predicts a content that will be viewed next by the user from the channel zapping operation predicted by the channel zapping operation prediction section (203). A read-ahead execution section (206) conducts a read-ahead on the predicted content.

8 Claims, 37 Drawing Sheets

FIG. 9

| NUMBER OF CHANNELS | APPEARANCE PROBABILITY |
|---|---|
| −Nmax | 0% |
| : | : |
| −8 | 5% |
| −7 | 10% |
| −6 | 20% |
| −5 | 10% |
| −4 | 0% |
| −3 | 5% |
| −2 | 0% |
| +2 | 0% |
| +3 | 0% |
| +4 | 30% |
| +5 | 5% |
| +6 | 15% |
| +7 | 0% |
| +8 | 0% |
| : | : |
| +Nmax | 0% |

F I G. 1 8

| CONTENTS ATTRIBUTE | BUFFERING TIME (ms) |
|---|---|
| STREAMING (OUTSIDE HOME) | 3000 |
| STREAMING (INSIDE HOME) | 2000 |
| BROADCAST | 200 |
| FILE | 0 |

FIG. 33

| C11[5] | C11[6] | C11[7] | C11[1] | C11[2] | C11[3] | C11[4] |
|--------|--------|--------|--------|--------|--------|--------|
| C12[1] | C12[1] | C12[1] | C12[1] | C12[1] | C12[1] | C12[1] |
| C13[5] | C13[6] | C13[7] | C13[1] | C13[2] | C13[3] | C13[4] |
| C14[3] | C14[4] | C14[5] | C14[1] | C14[2] | C14[3] | C14[4] |
| C15[1] | C15[1] | C15[1] | C15[1] | C15[1] | C15[1] | C15[1] |
| C16[3] | C16[4] | C16[5] | C16[1] | C16[2] | C16[3] | C16[4] |
| C17[1] | C17[2] | C17[3] | C17[1] | C17[2] | C17[3] | C17[1] |

VIEWING TARGET HAVING A HIGH POSSIBILITY OF BEING VIEWED NEXT

CURRENTLY VIEWED CONTENTS

▨ PREDICTION REGION

F I G. 3 4

| C11[5] | C11[6] | C11[7] | C11[1] | C11[2] | C11[3] | C11[4] |
|---|---|---|---|---|---|---|
| C12[1] | C12[1] | C12[1] | C12[1] | C12[1] | C12[1] | C12[1] |
| C13[5] | C13[6] | C13[7] | C13[1] | C13[2] | C13[3] | C13[4] |
| C14[3] | C14[4] | C14[5] | C14[1] | C14[2] | C14[3] | C14[4] |
| C15[1] | C15[1] | C15[1] | C15[1] | C15[1] | C15[1] | C15[1] |
| C16[3] | C16[4] | C16[5] | C16[1] | C16[2] | C16[3] | C16[4] |
| C17[1] | C17[2] | C17[3] | C17[1] | C17[2] | C17[3] | C17[1] |

VIEWING TARGET HAVING A HIGH POSSIBILITY OF BEING VIEWED NEXT

CURRENTLY VIEWED CONTENTS

▨ PREDICTION REGION

FIG. 36

| C11[5] | C11[6] | C11[7] | C11[1] | C11[2] | C11[3] | C11[4] |
|---|---|---|---|---|---|---|
| C12[1] | C12[1] | C12[1] | C12[1] | C12[1] | C12[1] | C12[1] |
| C13[5] | C13[6] | C13[7] | C13[1] | C13[2] | C13[3] | C13[4] |
| C14[3] | C14[4] | C14[5] | C14[1] | C14[2] | C14[3] | C14[4] |
| C15[1] | C15[1] | C15[1] | C15[1] | C15[1] | C15[1] | C15[1] |
| C16[3] | C16[4] | C16[5] | C16[1] | C16[2] | C16[3] | C16[4] |
| C17[1] | C17[2] | C17[3] | C17[1] | C17[2] | C17[3] | C17[1] |

VIEWING TARGET HAVING THE HIGHEST POSSIBILITY — C12[1]

CURRENTLY VIEWED CONTENTS — C14[1]

VIEWING TARGET HAVING THE SECOND HIGHEST POSSIBILITY — C16[3]

▨ PREDICTION REGION

F I G. 3 7
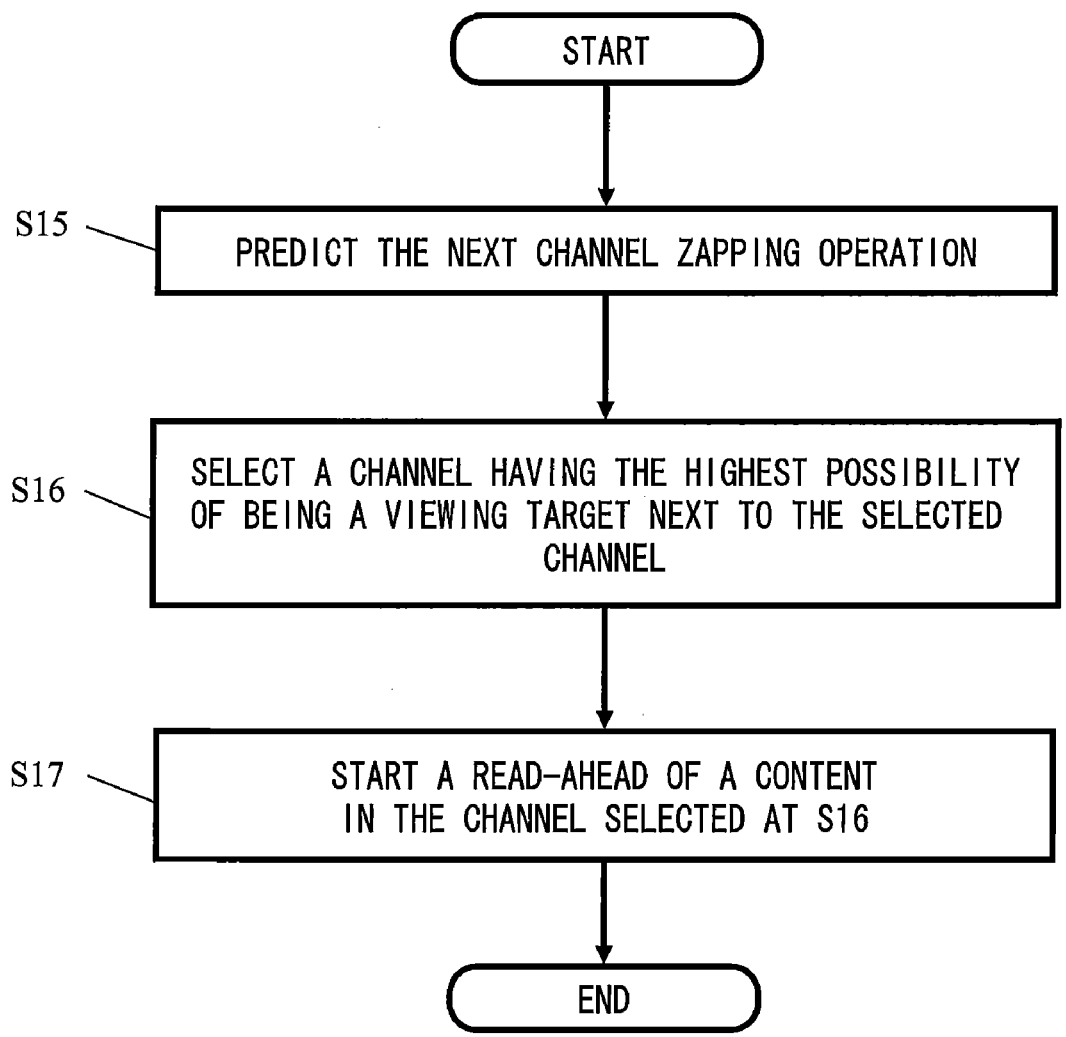

CONTENTS READ-AHEAD CONTROL DEVICE AND READ-AHEAD CONTROL METHOD

TECHNICAL FIELD

The present invention relates to shortening of the time for outputting, on a screen and the like, contents that require time for loading, including digital broadcasting and contents for streaming reproduction.

BACKGROUND ART

In recent years, terminals such as televisions capable of receiving and outputting digital broadcasting contents, video contents on networks (hereinafter, referred to as streamed video contents), and the like have been commercially produced; and products including such terminals are increasing in numbers. In addition, products capable of outputting similar contents are starting to emerge in the field of mobile instruments such as mobile phones; and such products including such terminals are increasing in numbers.

Among the contents described above, when compared to analog broadcasting, it is necessary in digital broadcasting to conduct various processes such as decoding, and a processing time required from the start of an acquisition of data to a display of an image is lengthy. Furthermore, with regard to the streamed video contents, it is necessary to conduct a pre-buffering process for a stable reproduction; thereby, the processing time required to display an image is lengthier when compared to digital broadcasting.

Meanwhile, on a topic of television viewing methods, in order to search for a program that draws his or her interest, a user conducts a channel zapping operation, which is to frequently switch and view channels in a short period of time. However, when compared to conventional analog broadcasting, digital broadcasting and streamed video contents require longer processing time from the start of an acquisition of data to a display of an image. Therefore, when compared to conventional analog broadcasting, upon switching to a channel, for digital broadcasting and streamed video contents, there is a time lag between the channel-switching and the displaying of an image.

In order to solve such a problem, for example, an invention disclosed in patent literature 1 pre-buffers video contents that are in channels in proximity of a currently viewed channel. In said invention, as a result of the pre-buffering, video contents are quickly outputted when a channel is selected by a user operation. Therefore, a comfortable operability is attained in a case where the user conducts a channel zapping operation with digital broadcasting and streamed video contents.

CITATION LIST

Patent Literature

[PTL 1] Japanese Laid-Open Patent Publication No. 2005-341334

SUMMARY OF THE INVENTION

Problems to be Solved by the Invention

However, the invention disclosed in patent literature 1 has the following problem. When conducting a channel zapping operation, the user will not necessarily view only video contents in channels in proximity of the currently viewed channel. For example, due to a habit when conducting the channel zapping operation, the user may view contents that are in channels distant from the currently viewed channel by skipping many channels. For example, even if the video contents are pre-buffered as in patent literature 1, the user may suddenly switch, by a channel zapping operation, to a channel distant from the currently viewed channel. In such a case, buffering of the video contents that will be viewed next by the user falls behind, and there will be a time lag before an output of the contents begins.

The present invention solves the problem described above, and the objective is to provide a contents read-ahead control device that shortens the time before an output of the contents begins, even when a user suddenly switches, by a channel zapping operation, to a channel distant from a currently viewed channel.

Solution to the Problems

A contents read-ahead control device of the present invention that achieves the above described objective, is a contents read-ahead control device included in a contents output apparatus which outputs contents, and includes: a contents map retain section which stores a contents map having described therein a sequential order in which contents are switched by a specific user operation; an operation judgment section which judges, based on the specific user operation, a channel zapping operation of continuously switching the contents; a channel zapping operation history storage section which cumulatively stores the channel zapping operation judged by the operation judgment section; a channel zapping operation prediction section which predicts a channel zapping operation that will be conducted next, based on a history of a plurality of channel zapping operations stored in the channel zapping operation history storage section; a viewing target prediction section which predicts at least one viewing-target content that will be viewed next by a user, based on the contents map and the channel zapping operation predicted by the channel zapping operation prediction section as to be conducted next; and a read-ahead execution section which conducts a read-ahead on the at least one viewing-target content predicted by the viewing target prediction section.

Furthermore, the viewing target prediction section may predict a content that has the highest possibility of being viewed next by the user and a content that is in proximity on the contents map to said content, based on the contents map and the channel zapping operation that will be conducted next.

Furthermore, the contents read-ahead control device of the present invention may further include a contents attribute table which stores a necessary buffering time for each of the contents; wherein the viewing target prediction section may include a read-ahead target judgment section which refers to the contents attribute table and selects, among the at least one viewing-target content, one part of the contents, based on the necessary buffering time; and the read-ahead execution section may conduct a read-ahead on the one part the contents.

Furthermore, the read-ahead target judgment section may select, as the one part of the contents, a predetermined number of the contents from the at least one viewing-target content, in a descending order of the necessary buffering time.

Furthermore, the predetermined number may be the maximum number of contents on which a read-ahead can be conducted, which is determined based on a storage capacity of the contents output apparatus.

Furthermore, the contents read-ahead control device of the present invention further includes an external factor acquisition section which periodically measures a data reception condition in a network, and which updates the necessary buffering time in the contents attribute table.

Furthermore, the contents map retain section may acquire a contents map from a map generation section which is included in the contents output apparatus and which generates a contents map.

In addition, a contents read-ahead control method of the present invention is a contents read-ahead control method included in a contents output apparatus which outputs contents, and includes: a channel zapping operation prediction step of predicting, based on a history of cumulatively stored channel zapping operations of continuous switching of the contents conducted by a user operation, a channel zapping operation that will be conducted next; a viewing target prediction step of predicting at least one viewing-target content that will be viewed next by a user, based on a contents map having described therein a sequential order in which the contents are switched by a specific user operation and on the channel zapping operation that is predicted at the channel zapping operation prediction step as to be conducted next; and a read-ahead execution step of conducting a read-ahead on the at least one viewing-target content predicted at the viewing target prediction step.

Advantageous Effects of the Invention

A contents read-ahead control device and method of the present invention predict video contents having a high possibility of being viewed next by a user, based on a history of channel zapping operations conducted by the user in the past. Therefore, the contents read-ahead control device and method of the present invention are capable of shortening the time before an output of contents begins, even when the user suddenly switches to a channel distant from a currently viewed channel by conducting a channel zapping operation.

BRIEF DESCRIPTION OF THE DRAWINGS

FIG. 9 shows one example of a prediction result obtained from a channel zapping operation prediction section 203.

FIG. 18 shows one example of a contents attribute table.

FIG. 33 shows one example indicating a prediction region determined by a viewing target prediction section 205c.

FIG. 34 shows one example indicating a prediction region determined by the viewing target prediction section 205c.

FIG. 36 shows a specific example for describing contents of operations subsequent to step S81 in FIG. 31.

FIG. 37 is a flowchart showing one example of operations of the contents read-ahead control device 200 when starting a read-ahead of video contents.

DESCRIPTION OF EMBODIMENTS

First Embodiment

Figure 1:
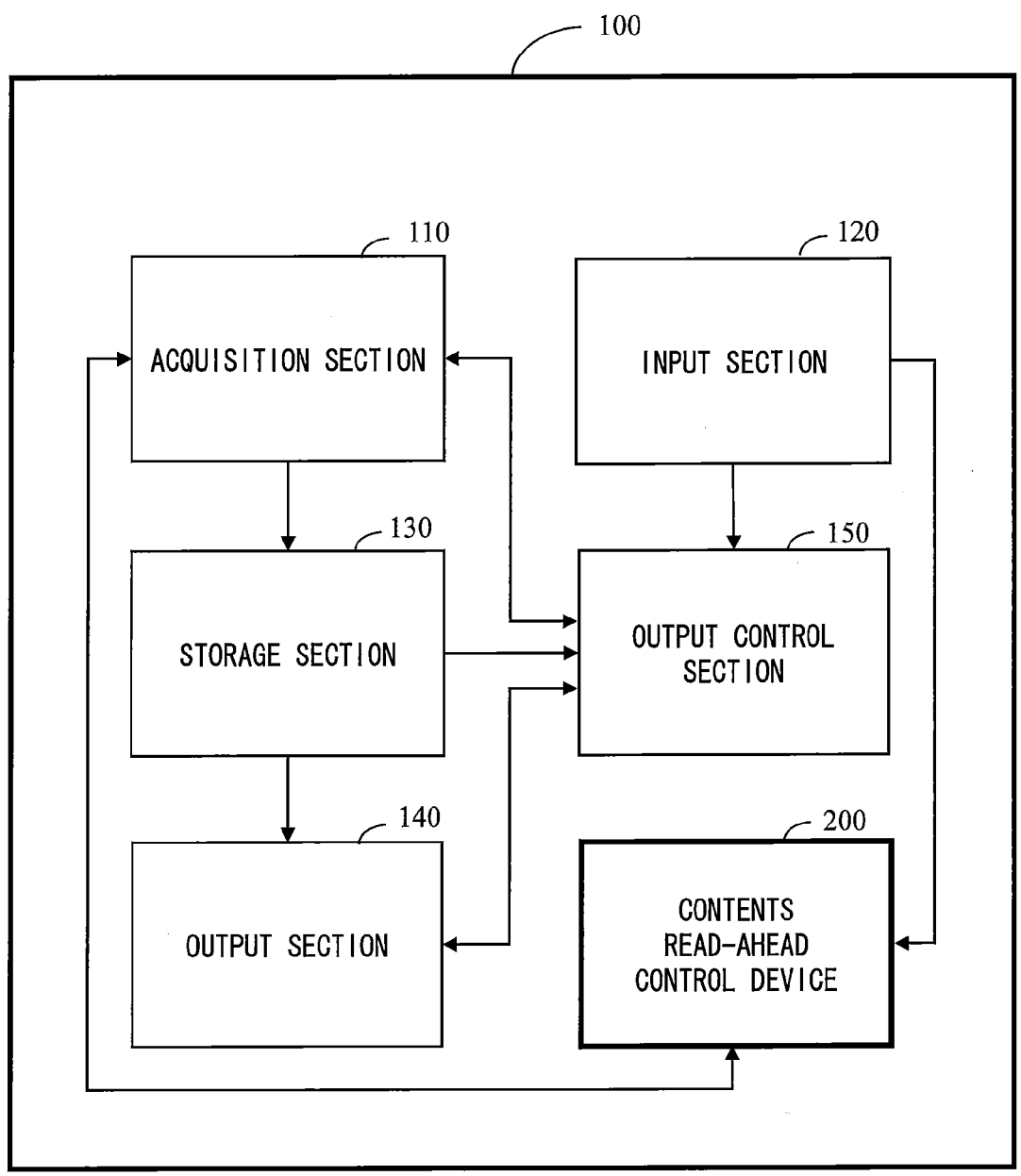
FIG. 1 shows the overall configuration of a contents output apparatus 100 including a contents read-ahead control device 200 according to a first embodiment of the present invention.

FIG. 1 shows the overall configuration of a contents output apparatus 100 including a contents read-ahead control device 200 according to a first embodiment of the present invention. The contents output apparatus 100 is a television for receiving broadcast waves transmitted from a broadcasting station, or a mobile terminal that is carried outside home.

A user switches from one content to another after confirming information regarding a content, by conducting a channel zapping operation on the contents output apparatus 100. Here, the information used by the user to confirm a content includes a title, reproduction time, a thumbnail, casts, and popularity of the content. Furthermore, the user can switch from one content to another while confirming the displayed information of a content, by operations such as pressing a key for a prolonged period of time. The contents output apparatus 100 is a terminal that enables screen display and the like which accommodates such a viewing mode of the user.

The contents output apparatus 100 includes an acquisition section 110, an input section 120, a storage section 130, an output section 140, an output control section 150, and the contents read-ahead control device 200.

Figure 2:
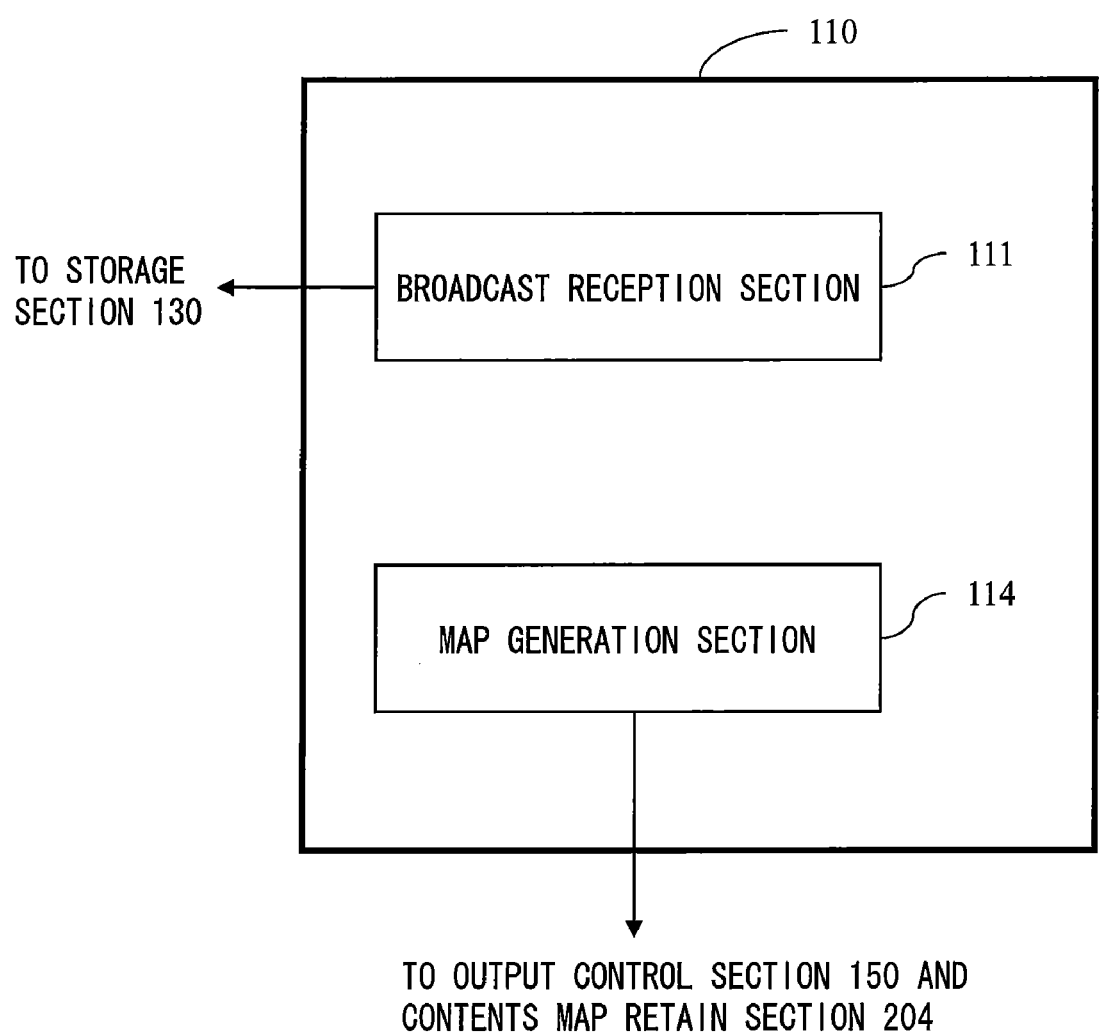
FIG. 2 shows an internal configuration of an acquisition section 110 of the first embodiment of the present invention.

The acquisition section 110 receives broadcast waves, and generates a contents map, which is described later. FIG. 2 shows an internal configuration of the acquisition section 110. The acquisition section 110 includes a broadcast reception section 111 and a map generation section 114.

The broadcast reception section 111 receives a video content transmitted from the broadcasting station, and buffers the received video content in the storage section 130. Furthermore, the broadcast reception section 111 receives an electronic program guide or the like that is superimposed on the electronic waves from the broadcasting station and transmitted.

Figure 3:
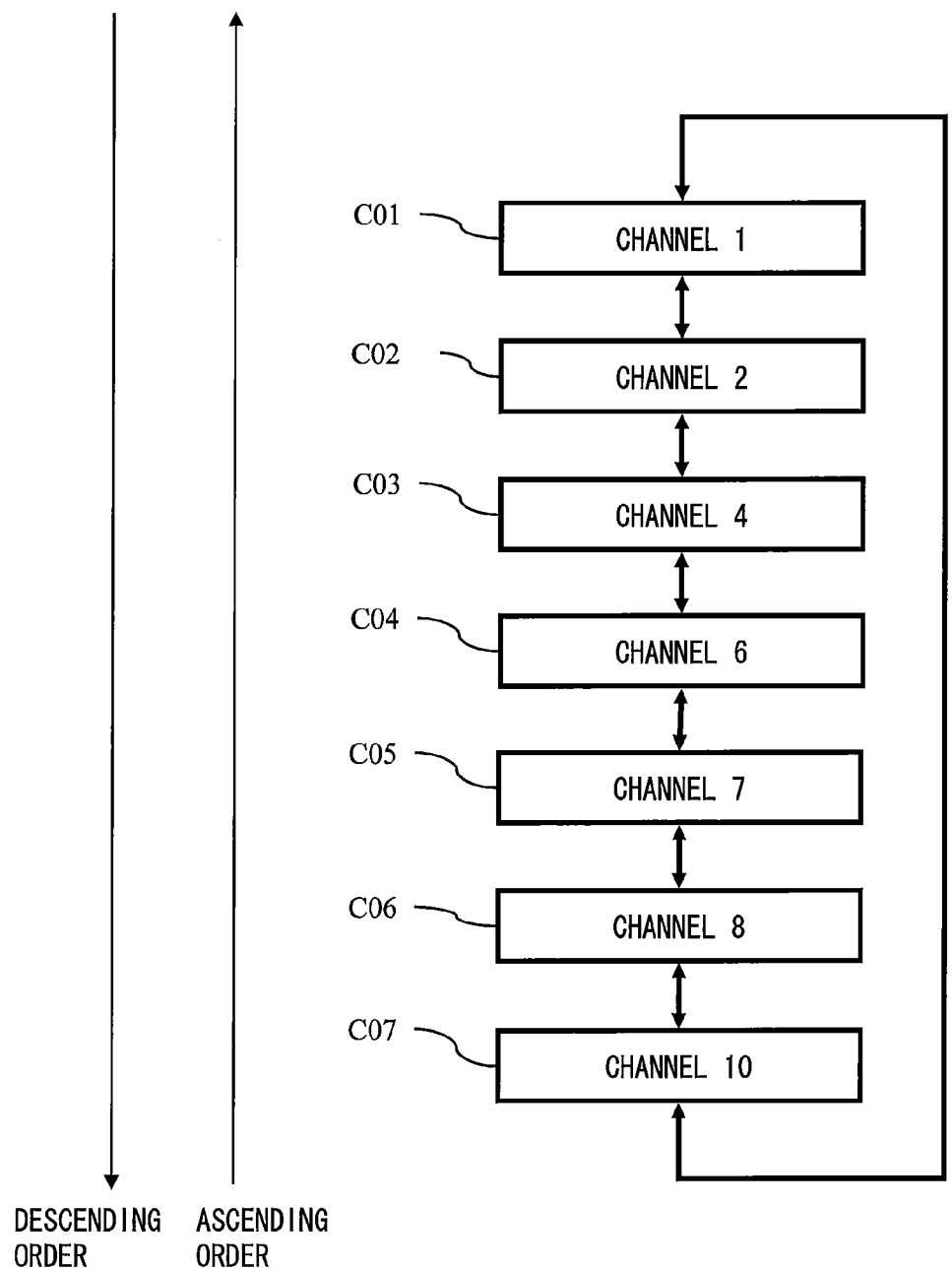
FIG. 3 is a conceptual diagram of a contents map 119 of the first embodiment of the present invention.

Based on the electronic program guide described above, the map generation section 114 generates a contents map 119 that includes a list of videos transmitted by receivable broadcast stations. It should be noted that, instead of simply having the contents map 119 generated upon receiving the electronic program guide, the contents map 119 may be stored in the acquisition section 110 in advance, or may be generated by the user when configuring the initial settings of the contents output apparatus 100. FIG. 3 shows a conceptual diagram of the contents map 119 according to the first embodiment.

The contents map shown in FIG. 3 indicates an example in which the acquisition section 110 arranges channels of the receivable broadcasting stations in a single dimension. In this example, when viewing is conducted through channel zapping by the user, a channel switching operation is only conducted in an ascending order or a descending order shown in FIG. 3. Furthermore, in this example, the channels are switched one by one in an arrow direction in the ascending order or the descending order by a single channel switching operation. The switching operation in the ascending order is conducted, for example, by having the user press an up-button included in the input section 120. Furthermore, the switching operation in the descending order is conducted, for example, by having the user press a down-button included in the input section 120.

Returning to FIG. 1, the input section 120 includes operation buttons such as keybuttons and four-directions button, or a pressure-sensitive type touch panel for receiving a content switching operation and the like from the user. Furthermore, the input section 120 may consist of two components, a remote controller and a controller reception section. In such a case, the input section 120 receives the content switching operation and the like from the user as a result of having the remote controller receive an operation by the user and transmit a signal to the controller reception section, and having the controller reception section receive the signal. After receiving a user operation, the input section 120 outputs user operation information 121 (not shown) regarding the user operation to the output control section 150 and to the contents read-ahead control device 200.

The storage section 130 buffers the video content. The storage section 130 is typically attained by a storage device such as a nonvolatile memory in which a stored content does not disappear even when power is disconnected therefrom.

The output section 140 follows an instruction of the output control section 150 to display the video content buffered in the storage section 130 and to conduct an audio output. In addition, the output section 140 may output the information of the content together with the video content or before outputting the video content. It should be noted that, depending on the type the contents output apparatus 100, the output section 140 may be one that does not include an audio output function.

When the user operation information 121 acquired from the input section 120 is information regarding a channel switching operation, the output control section 150 switches the channel to one that is desired by the user to be viewed, based on the contents map 119 acquired from the acquisition section 110. Furthermore, when the user operation information 121 is one that relates to operation information other than channel switching such as controlling of volume, the output control section 150 controls the output section 140 in accordance with the operation information.

Based on the user operation information 121 inputted from the input section 120, the contents read-ahead control device 200 judges whether a channel zapping operation is conducted, and stores channel zapping operation information as a history of channel zapping operations. The channel zapping operation information stored as a judgment of channel zapping operation and the history of channel zapping operations will be described later.

In addition, from the history of channel zapping operations, the contents read-ahead control device 200 predicts a channel zapping operation that will be conducted next by the user. Then, based on the predicted channel zapping operation, the contents read-ahead control device 200 causes the acquisition section 110 to receive a video content of a channel predicted to be viewed next by the user, and pre-buffers the video content in the storage section 130. It should be noted that, the channel predicted to be viewed next is a channel different from a channel received by the acquisition section 110 though a control of the output control section 150.

Figure 4:
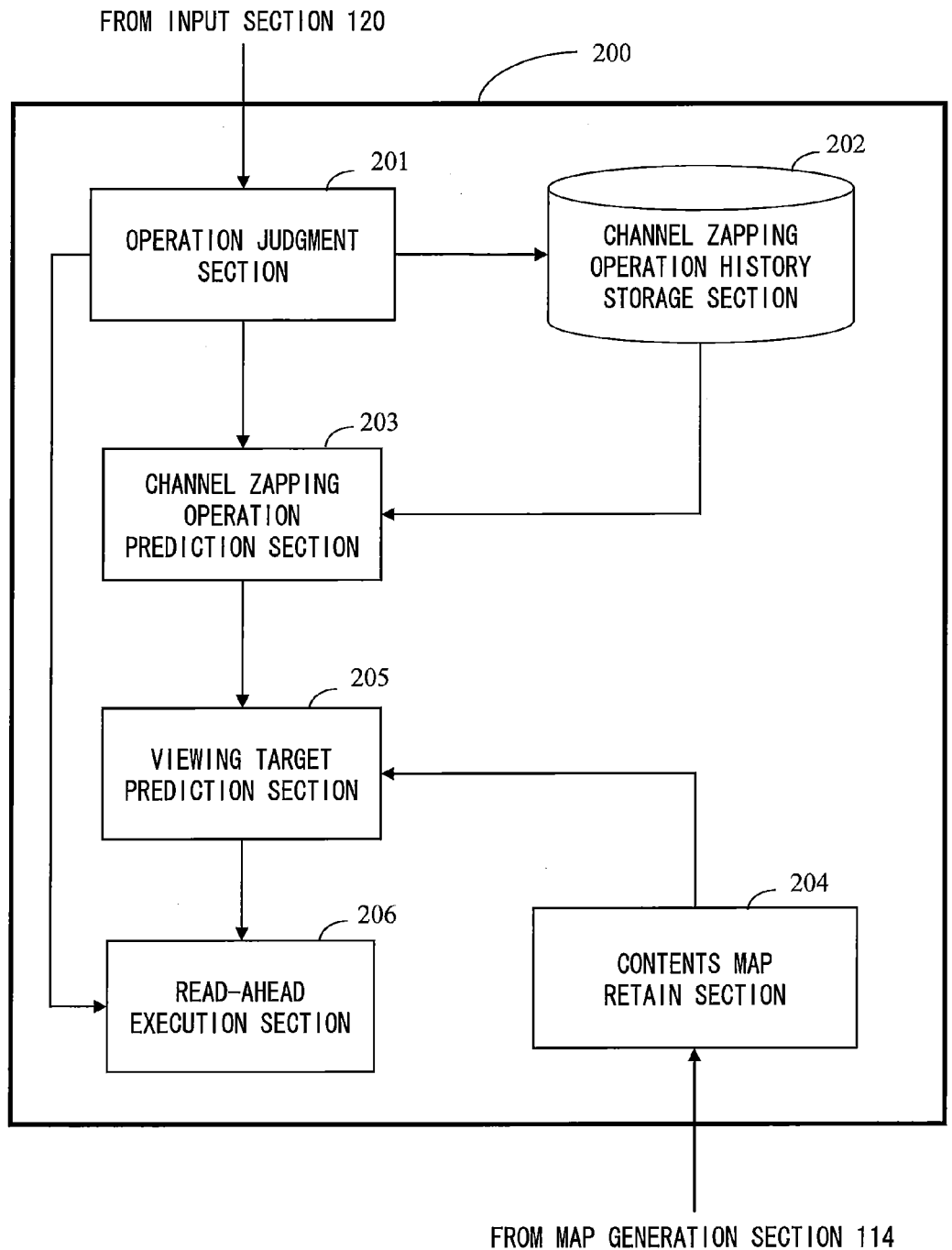
FIG. 4 shows an internal configuration of the contents read-ahead control device 200 according to the first embodiment of the present invention.

Details of an internal configuration of the contents read-ahead control device 200 of the present invention will be described next by using FIG. 4. The contents read-ahead control device 200 includes an operation judgment section 201, a channel zapping operation history storage section 202, a channel zapping operation prediction section 203, a contents map retain section 204, a viewing target prediction section 205, and a read-ahead execution section 206.

The operation judgment section 201 judges whether or not the user is conducting a channel zapping operation based on the user operation information 121 outputted from the input section 120. The judging method of a channel zapping operation will be described later. In addition, the operation judgment section 201 judges whether or not a channel switching operation is conducted within a predetermined time after an output of a content, based on the user operation information 121 outputted from the input section 120.

The channel zapping operation history storage section 202 stores information of an operation judged by the operation judgment section 201 as being a channel zapping operation by the user. This operation information refers to various information related to a channel zapping operation conducted by the user, such as date and time of the channel zapping, time spent for a single channel zapping operation, and the number of channels skipped by the channel zapping. It should be noted that, the format of a file used for saving the channel zapping operation history is one that can be used by a database. Such format includes XML (eXtensible Markup Language), and any other format can be used.

The channel zapping operation prediction section 203 predicts a next channel zapping operation predicted to be conducted by the user after viewing a currently viewed video content, based on the history of channel zapping operations stored in the channel zapping operation history storage section 202.

The contents map retain section 204 retains the contents map 119; and when the map generation section 114 of the acquisition section 110 newly generates the contents map 119, acquires the new contents map 119.

The viewing target prediction section 205 predicts a channel on the contents map 119 to which periphery the channel will be switched by a next channel zapping operation, based on the channel zapping operation predicted by the channel zapping operation prediction section 203.

The read-ahead execution section 206 executes a read-ahead of a video on the channel predicted by the viewing target prediction section 205. Specifically, the read-ahead execution section 206 causes the acquisition section 110 to start receiving a video content transmitted from a broadcasting station.

Figure 5:
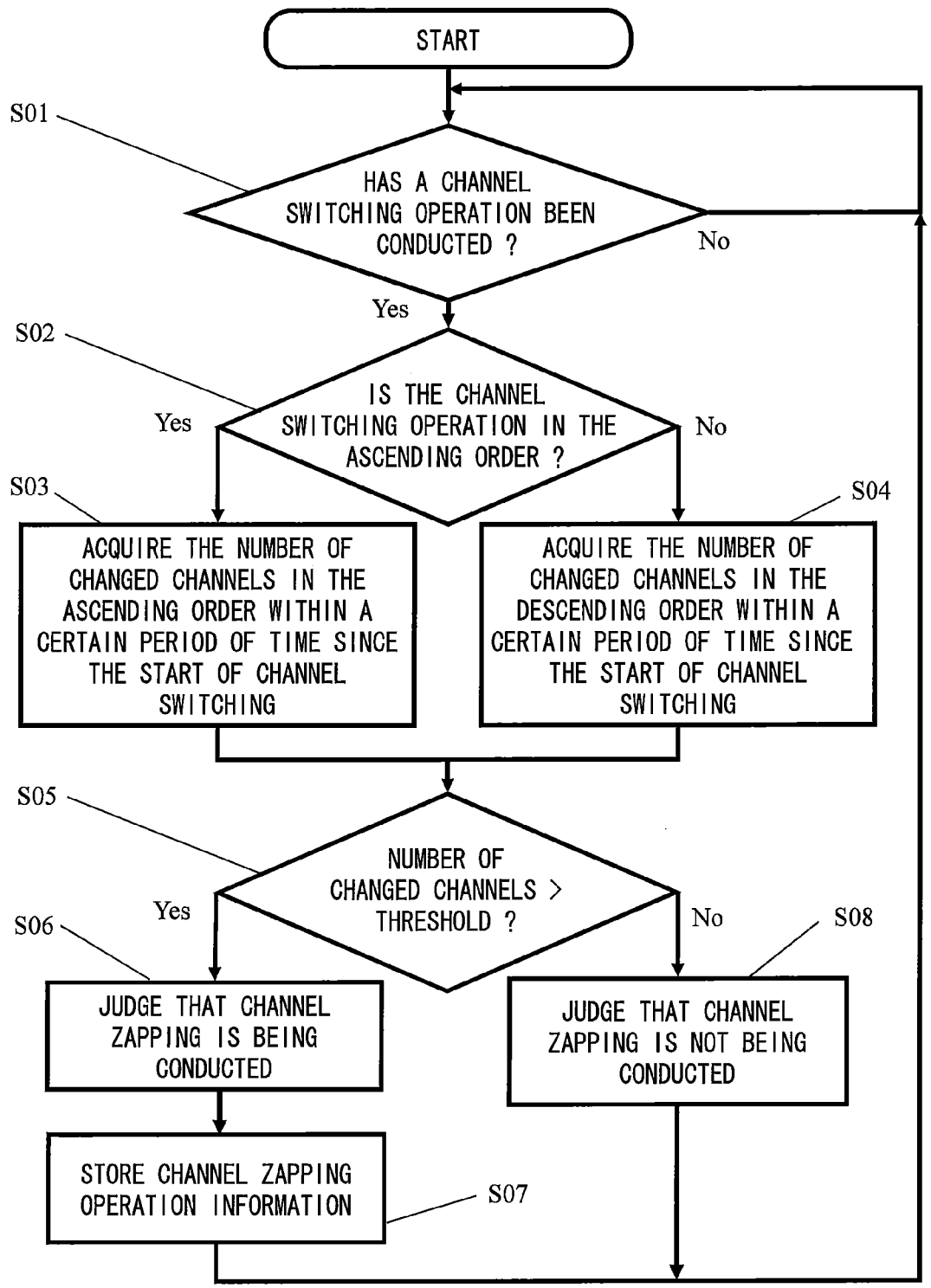
FIG. 5 is a flowchart showing one example of operations of the contents output apparatus 100 prior to an acquisition of a history of channel zapping operations.

The operations by the contents output apparatus 100, which is configured as described above, to acquire the history of channel zapping operations will be described in detail by using FIG. 5 and FIG. 6. FIG. 5 is a flowchart showing one example of operations of the contents output apparatus 100 prior to an acquisition of the history of channel zapping operations, in a case where a channel switching operation by the user is continuously detected at the input section 120. Here, the case, where a channel switching operation by the user is continuously detected at the input section 120, refers to any one of the following four cases.

(1) A case where the user repeatedly holds down an operation button.
(2) A case where the user repeatedly conducts a flick; in a mode where the output control section 150 switches a channel to the next in the ascending order or descending order depending on a direction of a single light swipe operation (flick) performed on a touch panel by the user with a finger.
(3) A case in which the user presses an operation button for a prolonged period of time to cause a signal regarding a switching operation to be detected, every time a certain period of time elapses, at the input section 120.
(4) A case in which the user presses an operation button for a prolonged period of time to cause identical signals regarding a switching operation to be continuously detected at the input section 120, and in which the input section 120 then judges whether or not a switching operation is to be executed based on the presence or absence of the signals every time a certain period of time elapses.

First, the operation judgment section 201 judges whether a channel switching operation has been conducted by the user, based on the user operation information 121 (step S01). If a channel switching operation is absent (No at step S01), the process returns to step S01.

When it is judged that a channel switching operation is present (Yes at step S01), the operation judgment section 201 judges whether the channel switching operation at step S01 is in the ascending order in FIG. 3, based on the user operation information 121 (step S02).

When the channel switching operation is conducted in the ascending order in FIG. 3 (Yes at step S02), the operation judgment section 201 acquires the number of changed channels in the ascending order inputted within a certain period of time since the channel switching operation at step S01 (step S03).

When the channel switching operation is conducted in the descending order in FIG. 3 (No at step S02), the operation judgment section 201 acquires the number of changed channels in the descending order inputted within a certain period of time since the channel switching operation at step S01 (step S04).

Next, the operation judgment section 201 judges whether the number of changed channels obtained at step S03 or step S04 is larger than a threshold determined in advance (step S05). If the number of changed channels is larger than the threshold (Yes at step S05), the operation judgment section 201 judges that channel zapping is being conducted (step S06). Then, the channel zapping operation history storage section 202 stores information of an operation judged as being a channel zapping operation by the user (step S07). On the other hand, if the number of changed channels is equal to or smaller than the threshold (No at step S05), the operation judgment section 201 judges that channel zapping is not being conducted (step S08). When the processes at steps S07 and S08 end, the state is returned to that at step S01.

It should be noted that, also when channel switching operations in the ascending order and the descending order are both conducted within a certain period of time since the start of the channel switching operation, and when the number of switching within the time period is large; the operation judgment section 201 can judge that viewing is conducted through channel zapping. In such cases, without conducting the judgment process at step S02 in FIG. 5, the operation judgment section 201 acquires only the number of changed channels in both the ascending order and the descending order within a certain period of time since the start of channel switching. Furthermore, the operation judgment section 201 may judge whether or not channel zapping is being conducted based on whether such number of changed channels exceeds a threshold determined in advance.

In such case, at step S07 in FIG. 5, the channel zapping operation history storage section 202 stores, as the history, the number and change directions (ascending order or descending order) of channel switching conducted starting from just before a channel zapping to the end of the channel zapping.

Figure 6:
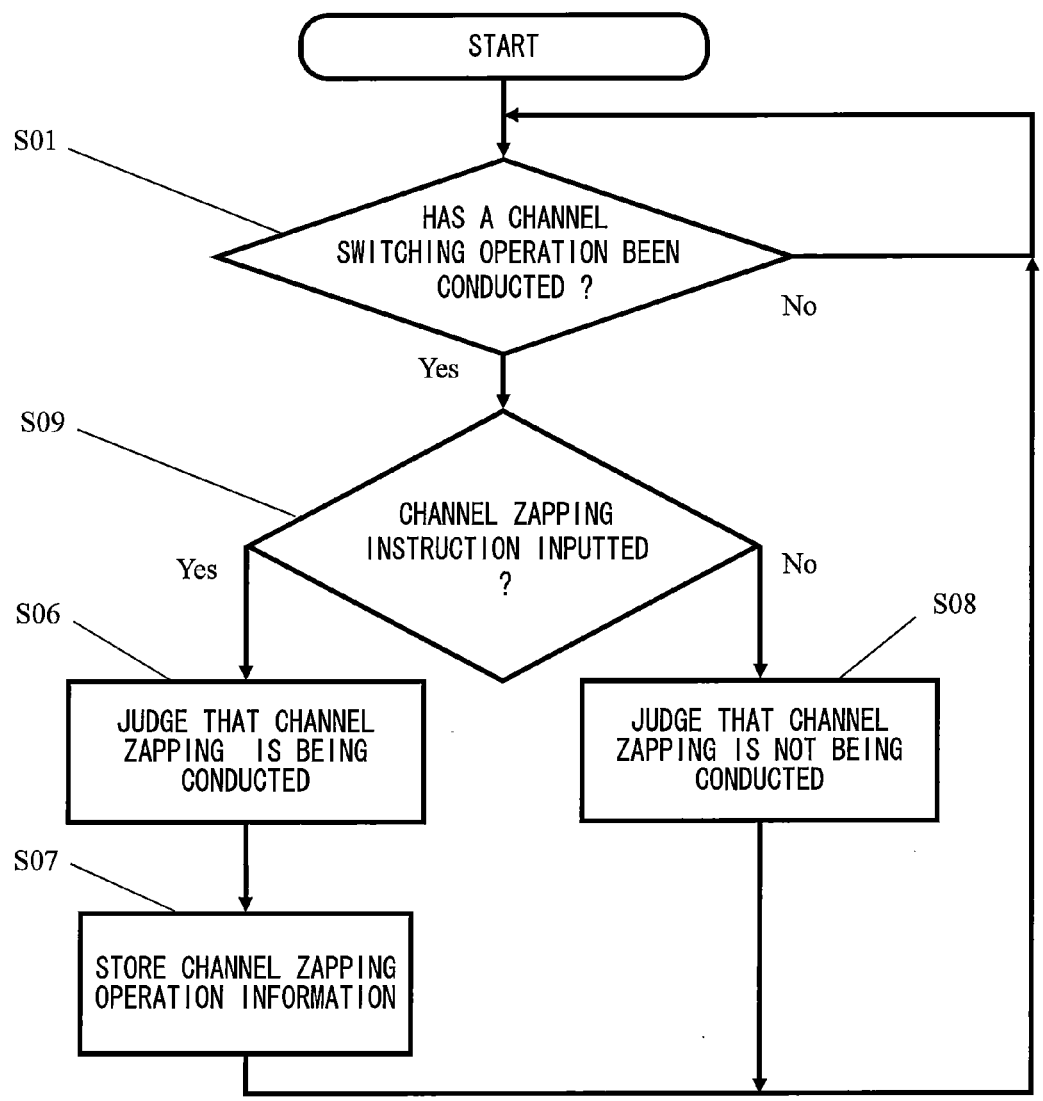
FIG. 6 is a flowchart showing one example of operations of the contents output apparatus 100 prior to the acquisition of the history of channel zapping operations.

FIG. 6 is a flowchart showing one example of operations of the contents output apparatus 100 prior to an acquisition of the history of channel zapping operations, in a case where a channel zapping instruction can be inputted in the input section 120 of the contents output apparatus 100. Such input of a channel zapping instruction refers to, for example, an input of holding down a scan button (a button that starts a channel zapping process when being held down) or the like. Or, the input of a channel zapping instruction refers to a light swipe operation (flick) that is conducted on a touch panel by the user with a finger and that is followed by a touch on the touch panel again by the user. Alternatively, the input of a channel zapping instruction refers to an input by a flick, when channel zapping is conducted by the output control section 150 for a time period depending on an operation velocity of the flick. In FIG. 6, processes that are identical to those in FIG. 5 are given identical reference characters, and thereby descriptions of those are omitted.

First, when the operation judgment section 201 judges the presence of a channel switching operation by the user (Yes at step S01), the operation judgment section 201 judges, based on the user operation information 121, whether there has been an input of a channel zapping instruction by the user (step S09). If it is judged that there has been an input of a channel zapping instruction by the user (Yes at step S09), the operation judgment section 201 judges that channel zapping is being conducted (step S06). On the other hand, if there is no input of a channel zapping instruction by the user (No at step S09), the operation judgment section 201 judges that channel zapping is not being conducted (step S08).

Operations of the contents output apparatus 100 when starting a read-ahead of a video content will be described next by using FIG. 7 to FIG. 11.

Figure 7:
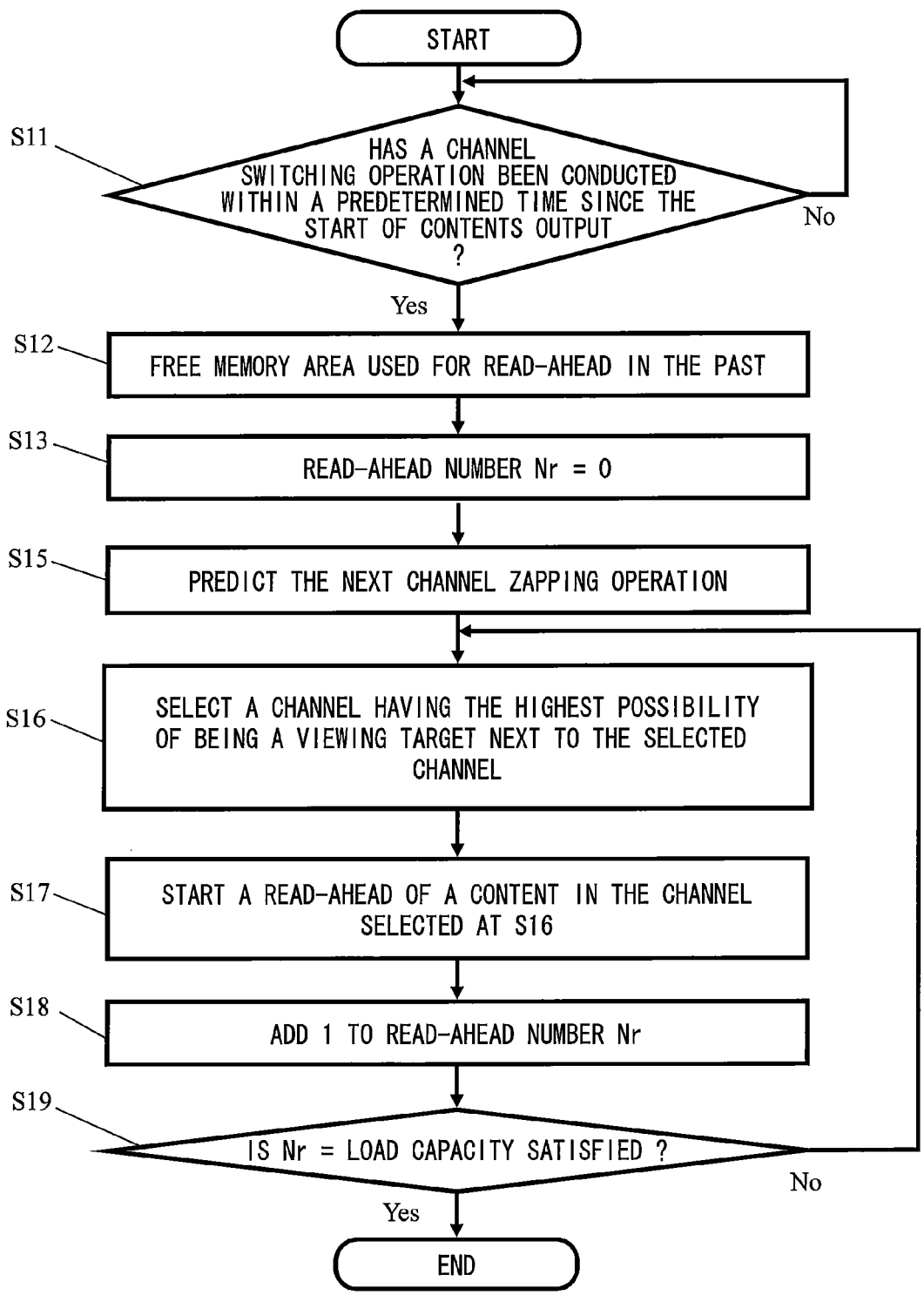
FIG. 7 is a flowchart showing one example of operations of the contents read-ahead control device 200 when starting a read-ahead of video contents.

FIG. 7 is a flowchart showing one example of operations regarding the contents read-ahead control device 200 when starting a read-ahead of a video content.

After an output of a content has been started by having the power turned on or by having a channel switched, the operation judgment section 201 first judges whether a channel switching operation has been conducted within a predetermined time (step S11). This predetermined time is set to an optimum value in advance for every individual contents output apparatus 100, and is stored in the contents read-ahead control device 200. If there is a channel switching operation within the predetermined time (No at step S11), the process is returned to step S11.

If it is judged that there is no channel switching operations within the predetermined time (Yes at step S11), it can be assumed that the user has started viewing the content. In this case, the read-ahead execution section 206 frees memory areas other than a memory area related to a video content on the channel currently viewed by the user (step S12). Such memory areas that are freed are memory areas used for past read-ahead; in other word, memory areas storing video contents on which a read-ahead has been conducted in the past.

Then, the read-ahead execution section 206 sets a read-ahead number Nr to 0 (step S13). This read-ahead number Nr is a counted value of the number video contents on which a read-ahead has been conducted.

Next, based on the channel zapping operation history stored in the channel zapping operation history storage section 202, the channel zapping operation prediction section 203 predicts the next channel zapping operation (step S15). Here, the channel zapping operation prediction section 203 may predict the next channel zapping operation based on all the past operation history, or may predict the next channel zapping operation based on the operation history in a certain number of the latest periods.

FIG. 9 is a table showing one example of a prediction result obtained from the channel zapping operation prediction section 203. The left column of this table includes the number of channels that have been move through in the ascending order or the descending order as a result of a single channel zapping operation. With regard to the plus and minus reference characters in the left column, "+" represents a movement of channels in the descending order, and "−" represents a movement of channels in the ascending order. The right column includes an appearance probability of each channel zapping operation. The appearance probability indicates a ratio of a certain channel zapping operation in the entire channel zapping history, which is used to predict the next channel zapping operation at step S15. The channel zapping operation prediction section 203 predicts the next channel zapping operation under an assumption that an operation having a high appearance probability in the past operation history has a high possibility of being conducted next by the user. The maximum value and the minimum value in the left column represented as ±Nmax are respectively the maximum value and minimum value of the number of moved-through channels, and are determined in advance by the channel zapping operation prediction section 203. In the following description, the appearance probabilities in FIG. 9 for the number of moved-through channels, between −Nmax or more but −9 or less, and between +9 or more but +Nmax or less are all 0%.

Next, the viewing target prediction section 205 selects a channel having the highest possibility of being a next viewing target based on the prediction result shown in FIG. 9 and the contents map 119 retained in the contents map retain section 204 (step S16). It should be noted that, when selecting a channel, the currently viewed channel and channels selected in the past are excluded from being a selection target. In addition, when step S16 is the first to be executed, the viewing target prediction section 205 selects a channel having the highest possibility of being a viewing target.

Next, the read-ahead execution section 206 starts a read-ahead of a content in the channel selected by the viewing target prediction section 205 (step S17).

Then, the read-ahead execution section 206 adds 1 to the read-ahead number Nr (step S18). Next, the read-ahead execution section 206 judges whether Nr has reached a load capacity (step S19). This load capacity is a maximum number of video contents on which a read-ahead can be conducted, and is determined based on a storage capacity of the storage section 130. If the load capacity has not been reached (No at step S19), processes subsequent to step S16 are executed again. If the load capacity has been reached (Yes at step S19), the contents read-ahead operation by the read-ahead execution section 206 ends.

Figure 8:
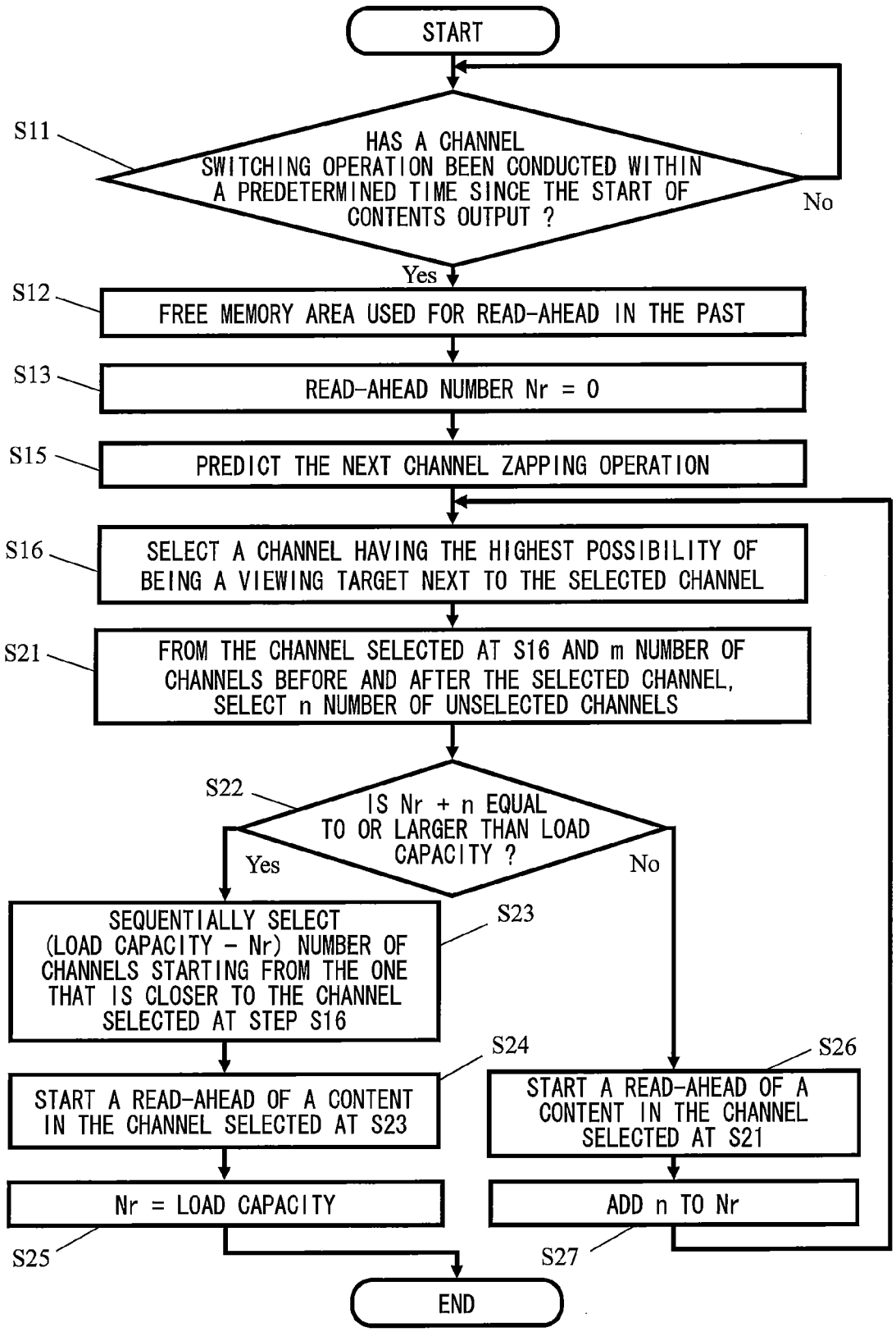
FIG. 8 is a flowchart showing one example of an operation of the contents read-ahead control device 200 when starting a read-ahead of the video contents.

In the operations in FIG. 7, if a channel zapping operation by the user deviates from the prediction result even slightly, the advantageous effect of the read-ahead cannot be exerted. FIG. 8 is a flowchart showing one example of operations of the contents read-ahead control device 200 that deals with this problem. In FIG. 8, operations that are identical to those in FIG. 7 are given identical reference characters, and thereby descriptions of those are omitted. In the following, operations that are different from those in FIG. 7 are described in detail.

At step S16, when a channel is selected, the viewing target prediction section 205 selects, from the channel selected at step S16 and m number of channels before and after thereof, unselected channels excluding the currently viewed channel (step S21). This m value is a value determined in advance, and is determined based on the storage capacity of the storage section 130. It should be noted that, in the following descriptions, the number of channels selected at step S21 is defined as n.

Next, the viewing target prediction section 205 judges whether Nr+n is equal to or greater than the load capacity (step S22). When Nr+n is equal to or greater than the load capacity (Yes at step S22), the viewing target prediction section 205 sequentially selects (load capacity−Nr) number of channels starting from the one that is closer to the channel selected at step S16 (step S23). Then, the read-ahead execution section 206 starts a read-ahead of the contents in the channels selected at step S23 (step S24), and sets Nr as the load capacity (step S25). The contents read-ahead operation ends after step S25.

When Nr+n is smaller than the load capacity (No at step S22), the read-ahead execution section 206 starts a read-ahead of a content in the channel selected at step S21 (step S26). Then, the read-ahead execution section 206 adds n to Nr (step S27). Then, the processes subsequent to step S16 are executed again.

Figure 10:
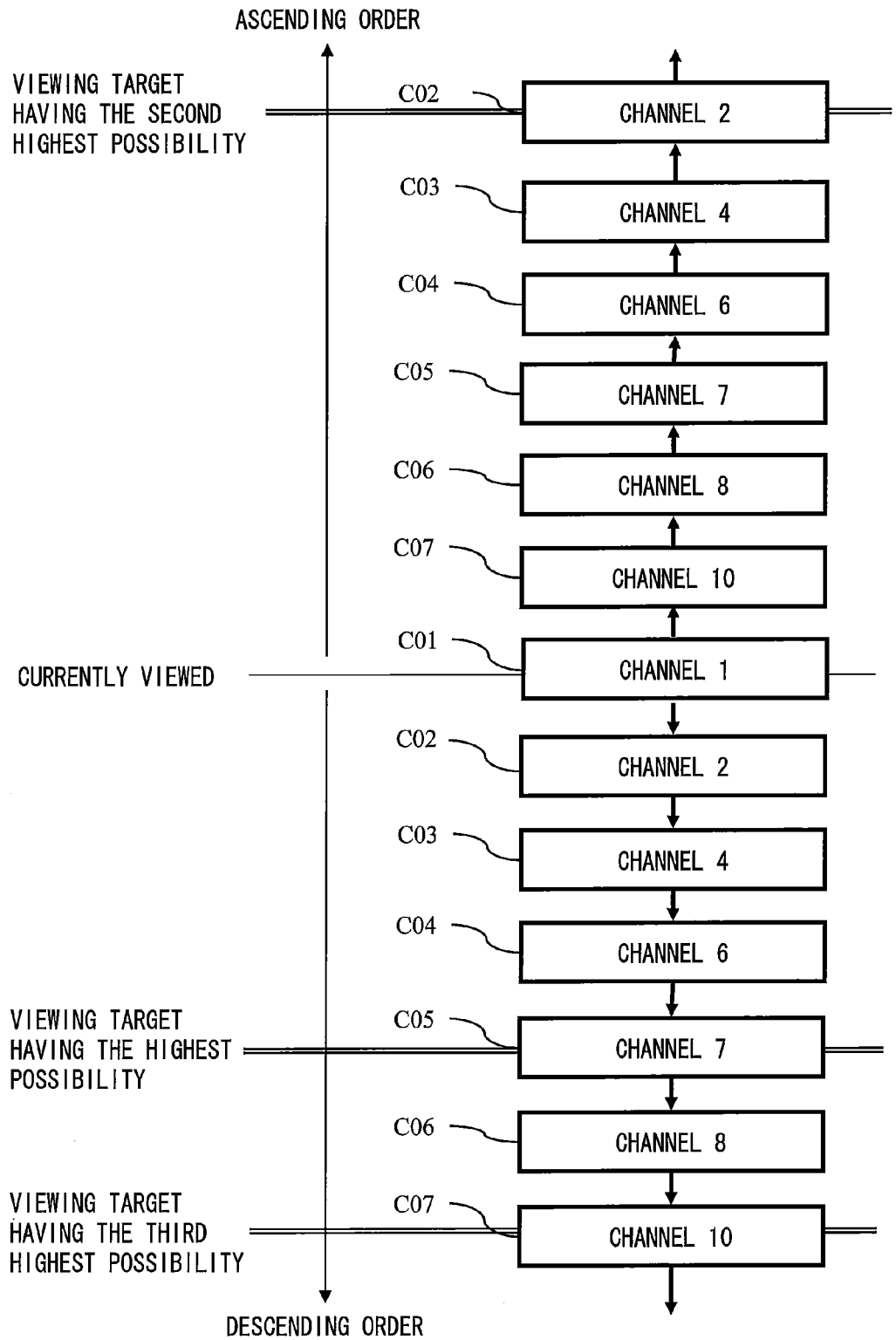
FIG. 10 shows a specific example for describing contents of operations subsequent to step S16 in FIG. 7.

Next, by using specific examples in FIG. 9 to FIG. 11, contents of operations subsequent to step S16 in FIG. 7 and FIG. 8 will be described in detail. FIG. 10 is a specific example for describing contents of operations subsequent to step S16 in FIG. 7. In FIG. 10, for convenience of description, each of the channels is given reference characters of C01 to C07 corresponding to each of the channels in FIG. 3. In addition, the prediction result shown in FIG. 9 is obtained at step S15 in FIG. 7, and the currently viewed channel is C01. Furthermore, the load capacity at step S19 in FIG. 7 is 3.

At step S16, the viewing target prediction section 205 recognizes that a channel zapping operation having the maximum appearance probability is "+4" from the prediction result in FIG. 9. Therefore, the viewing target prediction section 205 selects C05, which is the fourth channel from C01 in the descending order, as a channel having the highest possibility of being a viewing target.

In addition, at step S17, the read-ahead execution section 206 starts a read-ahead of a content in C05 selected at step S16. Then, at step S18, the read-ahead execution section 206 adds 1 to the read-ahead number Nr. Here, since the value of Nr is set to 0 at step S13, Nr=1 is derived. Since this Nr is less than the load capacity of 3, the read-ahead execution section 206 makes a judgment of "No" at step S19.

Next, returning to step S16, the viewing target prediction section 205 recognizes that a channel zapping operation having the second highest appearance probability is "-6" from the prediction result in FIG. 9. Therefore, the viewing target prediction section 205 selects C02, which is the sixth channel from C01 in the ascending order, as a channel having a high possibility of being a viewing target next to the already selected C05.

In addition, at step S17, the read-ahead execution section 206 starts a read-ahead of a content in C02 selected at step S16. Then, at step 18, the read-ahead execution section 206 adds 1 to the read-ahead number Nr to derive Nr=2. Since this Nr is less than the load capacity of 3, the read-ahead execution section 206 makes a judgment of "No" at step S19.

Next, returning to step S16 again, the viewing target prediction section 205 recognizes that a channel zapping operation having the third highest appearance probability is "+6" from the prediction result in FIG. 9. Therefore, the viewing target prediction section 205 selects C07, which is the sixth channel from C01 in the descending order, as a channel having a high possibility of being a viewing target after the already selected C05 and C02.

In addition, at step S17, the read-ahead execution section 206 starts a read-ahead of a content in C07 selected at step S16. Then, at step S18, the read-ahead execution section 206 adds 1 to the read-ahead number Nr to derive Nr=3. Since this Nr matches the load capacity of 3, the read-ahead execution section 206 makes a judgment of "Yes" at step S19. Then, the contents read-ahead operation ends.

Figure 11:
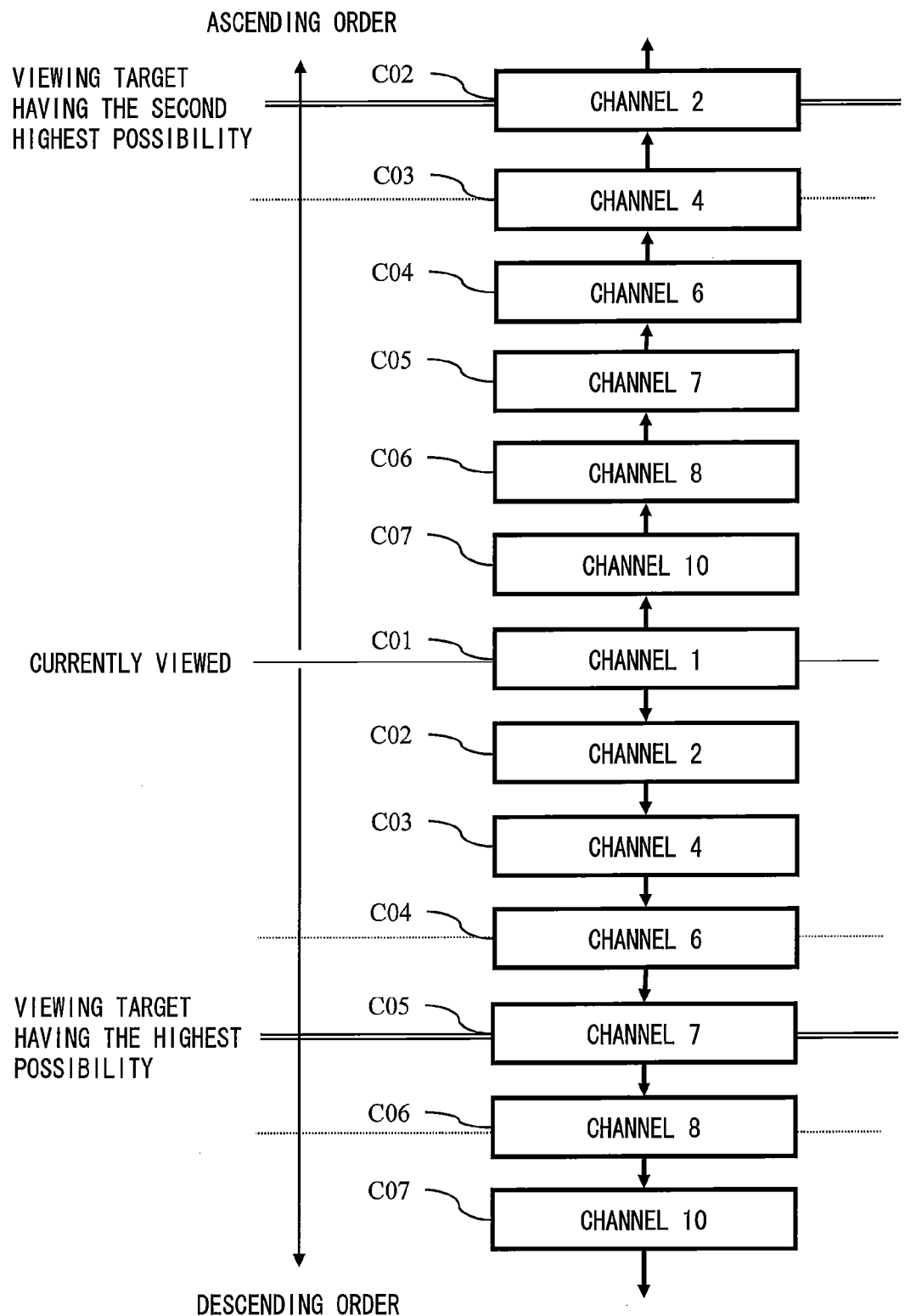
FIG. 11 shows a specific example for describing contents of operations subsequent to step S16 in FIG. 8.

FIG. 11 is a specific example for describing contents of operations subsequent to step S16 in FIG. 8. In FIG. 11, for convenience of description, each of the channels is given reference characters of C01 to C07 corresponding to each of the channels in FIG. 3. Also in FIG. 11, the prediction result shown in FIG. 9 is obtained at step S15 in FIG. 8, and the currently viewed channel is C01. Furthermore, the value of m at step S21 is 1 in FIG. 8, and the load capacity subsequent to step S22 in FIG. 8 is 5.

At step S16, the viewing target prediction section 205 recognizes that a channel zapping operation having the maximum appearance probability is "+4" from the prediction result in FIG. 9. Therefore, the viewing target prediction section 205 selects C05, which is the fourth channel from C01 in the descending order, as a channel having the highest possibility of being a viewing target.

Next, at step S21, the viewing target prediction section 205 selects C04 and C06, which are channels before or after C05 by one. Here, since C04 to C06 are channels that are not currently viewed and have not been selected yet, the viewing target prediction section 205 selects all of C04 to C06. Therefore, the value of n at step S21 becomes 3.

In addition, at step S22, the viewing target prediction section 205 calculates the value of Nr+n. Here, since the value of Nr is set to 0 at step S13, Nr+n=3 is derived and Nr+n will be less than the load capacity of 5. Therefore, the viewing target prediction section 205 makes a judgment of "No" at step S22.

Then, at step S26, the read-ahead execution section 206 starts a read-ahead of contents in C04 to C06, which are selected at step S17. Then, at step S27, the read-ahead execution section 206 adds 3 to Nr.

Next, returning to step S16, the viewing target prediction section 205 recognizes that a channel zapping operation having the second highest appearance probability is "-6" from the prediction result in FIG. 9. Therefore, the viewing target prediction section 205 selects C02, which is the sixth channel from C01 in the ascending order, as the channel having the second highest possibility of being a viewing target next to the already selected C04.

In addition, at step S21, from among C02, which has been selected, and C01 and C03, which are channels before or after C02, the viewing target prediction section 205 selects C02 and C03, excluding the currently viewed C01. Therefore, the value of n at step S21 becomes 2.

Then, at step S22, Nr+n=5 is derived, and since this is equal to the load number, the viewing target prediction section 205 makes a judgment of "Yes" at step S22.

Then, at step S23, the viewing target prediction section 205 sequentially selects (load capacity−Nr) number of channels, i.e., two channels, starting from the one that is closer to the channel predicted at step S16. Here, the viewing target prediction section 205 selects two, C02 and C03.

Next, at step S24, the read-ahead execution section 206 starts a read-ahead of contents in C02 and C03, which are selected at step S23. Then, at step S25, the read-ahead execution section 206 changes Nr to the load capacity of 5. Then, the contents read-ahead operation ends.

It should be noted that, in the operations of the contents output apparatus 100 in FIG. 7 and FIG. 8, when step S16 is executed twice or more, the viewing target prediction section 205 may conduct the following operations at the second and the succeeding step S16. In this case, at the second or succeeding step S16, the viewing target prediction section 205 selects a channel to be switched to when a channel zapping operation having the highest appearance probability is conducted from the channel selected at the first step S16. At every succeeding step S16, the viewing target prediction section 205 sequentially selects channels to be switched to when a channel zapping operation having the highest appearance probability is conducted from a channel selected in a previous step S16.

Figure 12:
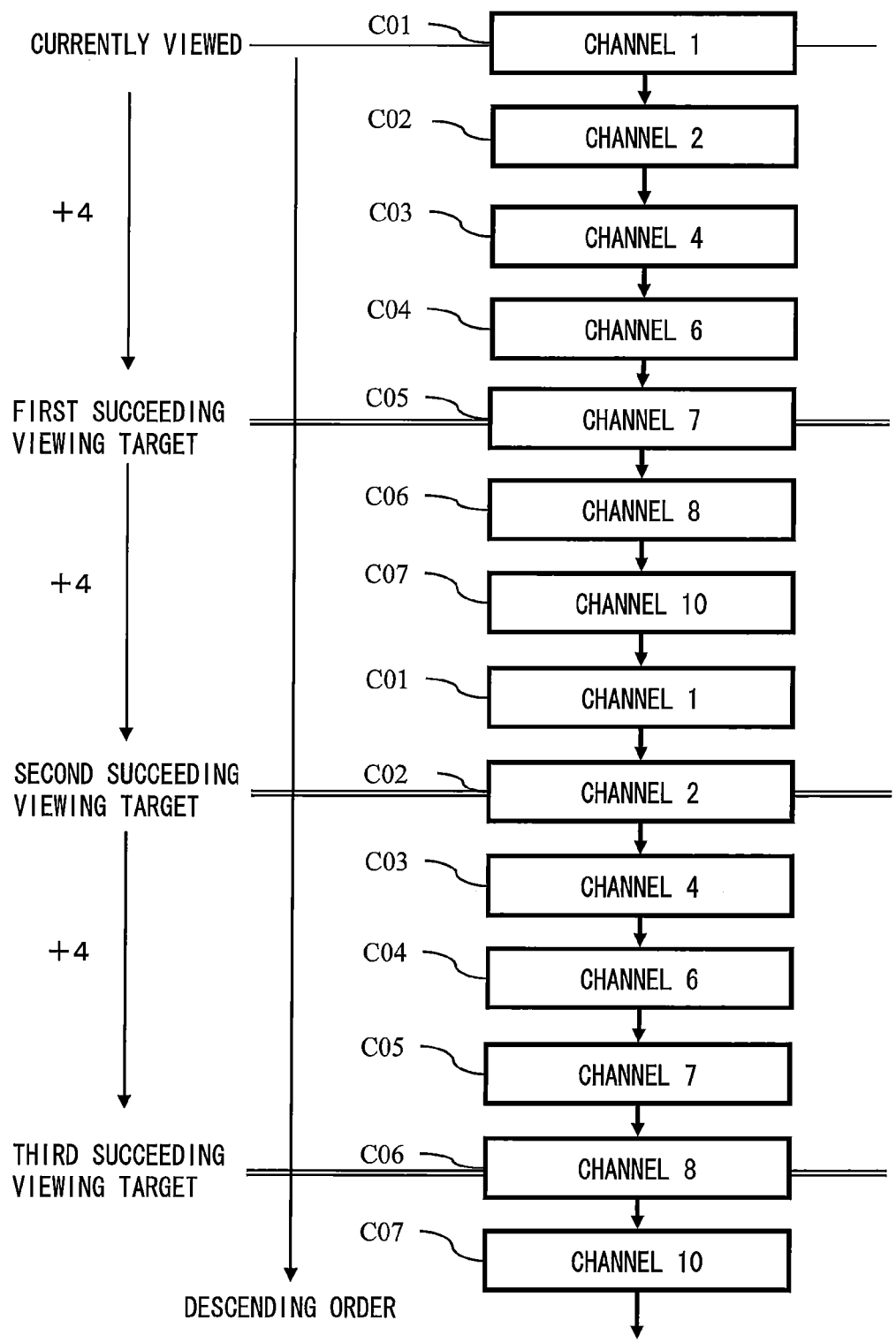
FIG. 12 shows a specific example for describing contents of operations of the contents read-ahead control device 200.

For example, when operations in FIG. 7 are conducted based on an example in FIG. 12, the viewing target prediction section 205 selects C05 (the first succeeding viewing target) at the first step S16. Then, at the second step S16, the viewing target prediction section 205 selects C02 (the second succeeding viewing target) which is the fourth channel from C05 in the descending order. Then, at the third step S16, the viewing target prediction section 205 selects C06 (the third succeeding viewing target) which is the fourth channel from C02 in the descending order.

Furthermore, in the operations of the contents output apparatus 100 in FIG. 7, when step S16 is executed twice or more, the viewing target prediction section 205 may conduct the following operation for the second and succeeding step S16. In this case, at the second or succeeding step S16, the viewing target prediction section 205 sequentially selects channels starting from the one that is closer to the channel selected at the first step S16 until reaching the load capacity. It should be noted that, among the two channels that are separated from the channel selected first by the same number of channels, the viewing target prediction section 205 may first select either one of the two by prioritizing either the descending order or the ascending order.

Figure 13:
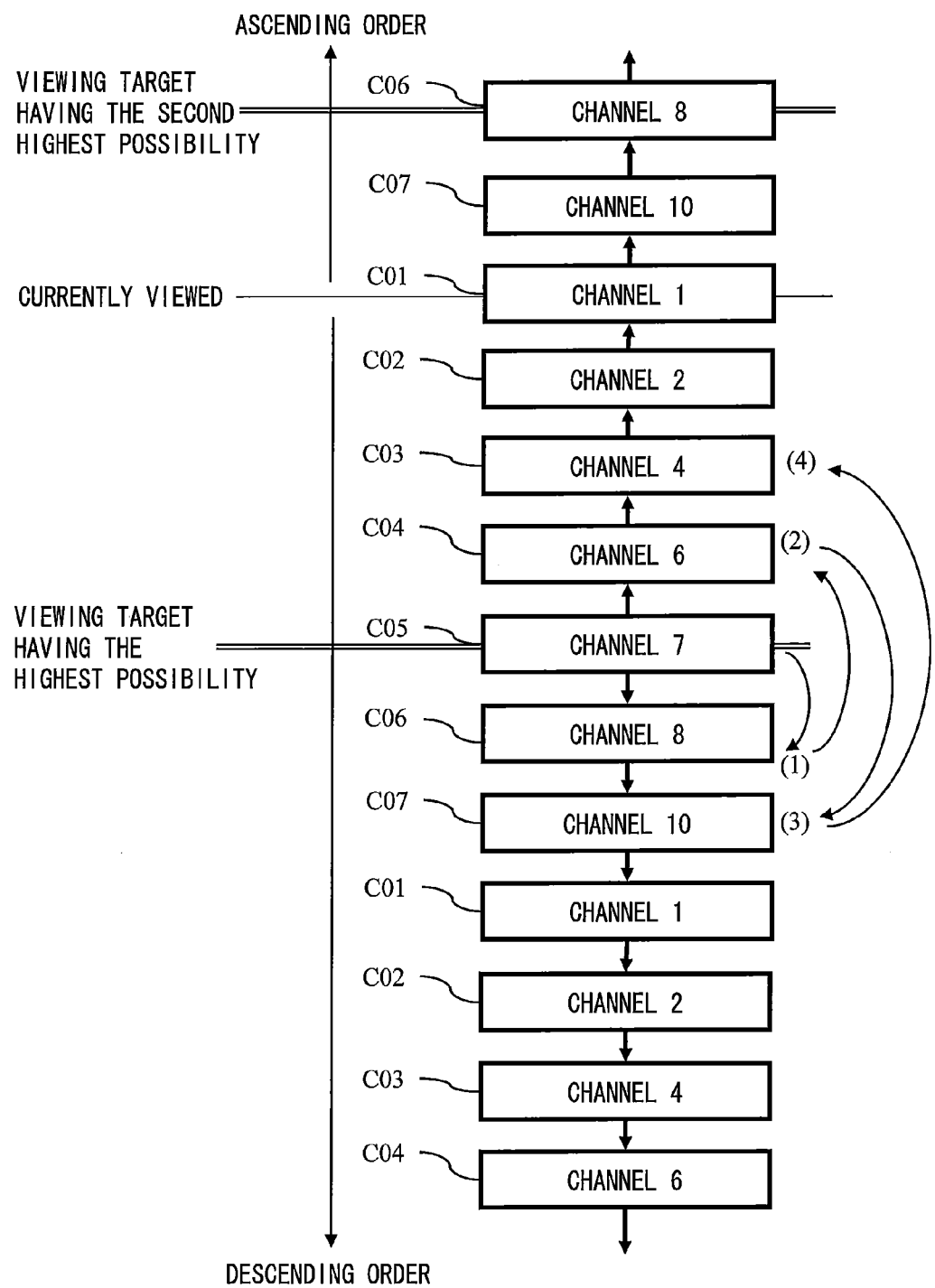
FIG. 13 shows a specific example for describing contents of operations of the contents read-ahead control device 200.

For example, in the example in FIG. 13, when C05 has the highest possibility of being the next viewing target and when the load capacity is 5, the viewing target prediction section 205 selects C05 at the first step S16. Next, at the second step S16, the viewing target prediction section 205 selects C06 ((1) in the figure). Then, at the third step S16, the viewing target prediction section 205 selects C04 ((2) in the figure). Furthermore, at the fourth step S16, the viewing target prediction section 205 selects C07 ((3) in the figure). And lastly, at the fifth step S16, the viewing target prediction section 205 selects C03 ((4) in the figure).

When the user starts viewing contents, the contents read-ahead control device can predict video contents having a high possibility of being viewed next by the user based on the history of channel zapping operations conducted by the user in the past. Therefore, even when the user suddenly switches to a channel distant from the currently viewed channel by conducting a channel zapping operation, the contents output apparatus including the contents read-ahead control device allows shortening the time before an output of contents starts.

In addition, since video contents predicted as having a low possibility of being viewed next by the user via a channel zapping operation do not become targets for buffering, the contents output apparatus including the contents read-ahead control device can save resources such as memory.

It should be noted that, since the operations of the channel zapping operation prediction section 203 described above do not identify users who have operated the contents output apparatus 100, histories of channel zapping operations by various users coexist, except for when the contents output apparatus 100 is a personal terminal. Therefore, if a channel zapping history of each user can be identified, the prediction accuracy of channel zapping operations can be improved. One example is a case where the channel zapping operation history storage section 202 manages a history of channel zapping operations conducted by each user, by having a function such as fingerprint authentication and login authentication in the input section 120, or by having a camera or the like mounted on the contents output apparatus 100 to enable a function of recognizing an image of a viewer. Then, based on the history of channel zapping operations conducted by each user, the channel zapping operation prediction section 203 can refer to only a history of a user who is currently viewing and can obtain a prediction result as shown in FIG. 9. With this, the prediction accuracy of channel zapping operations can be improved since the contents read-ahead control device can predict channel zapping operations from the history of each individual.

Furthermore, the time zone or the day of the week at which a user uses the contents output apparatus 100 is assumed to be different for every user and is fixed due to habits. Therefore, the channel zapping operation prediction section 203 may acquire, from the channel zapping operation history storage section 202, a history of channel zappings conducted at the same time zone (morning, around noon, daytime, evening, or night) or the same day of the week to which the current time belongs, and may obtain the prediction result as shown in FIG. 9 from this history. With this, the prediction accuracy of channel zapping operations can be improved since channel zapping operations can be predicted from a history having a high possibility of being generated in the past by an operation of a user who is currently viewing.

Furthermore, the channel zapping operation prediction section 203 may calculate the probability value as in FIG. 9 after assigning larger weights to histories of channel zapping operations generated closer to the current time. Instead, a channel zapping operation having the highest possibility of being conducted next may be predicted based on a tendency of changes in the past to present channel zapping operations. Furthermore, with regard to the prediction result obtained by the channel zapping operation prediction section 203, other than the probability as shown in FIG. 9, statistics such as average values and medians may be calculated to be used as prediction results.

Second Embodiment

Figure 14:
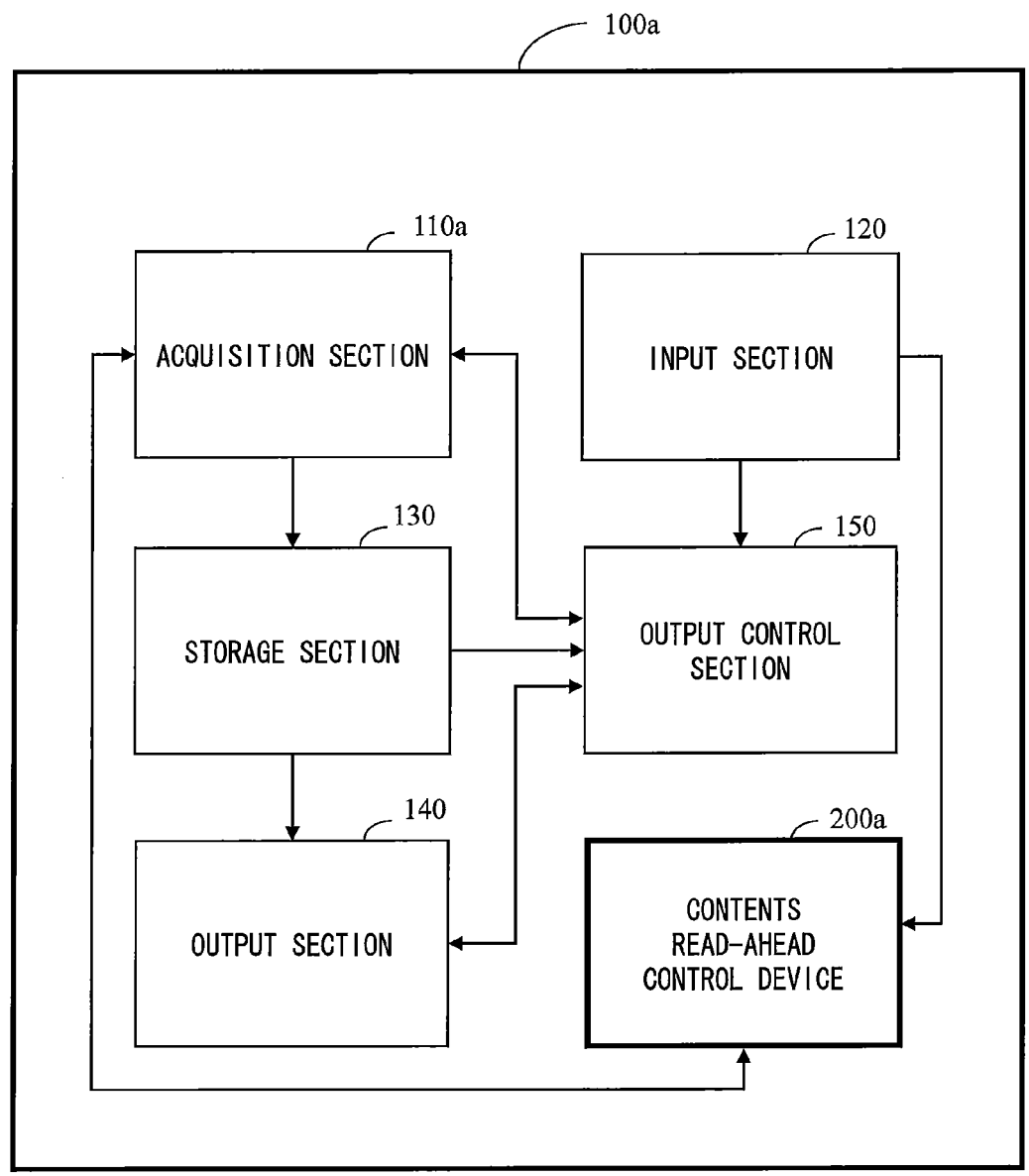
FIG. 14 shows the overall configuration of a contents output apparatus 100a including a contents read-ahead control device 200a according to a second embodiment of the present invention.

FIG. 14 shows the overall configuration of a contents output apparatus 100a including a contents read-ahead control device 200a according to a second embodiment of the present invention. The contents output apparatus 100a is a television or a mobile terminal that is to be carried outside home, and both of which includes the following function. The contents output apparatus 100a receives broadcast waves transmitted from a broadcasting station. In addition, the contents output apparatus 100a can be connected to a plurality of media including a memory card and a media server 400 (described later) that distributes streamed videos, and can acquire and reproduce contents. The contents output apparatus 100a of the second embodiment outputs contents requiring different reproduction means, such as streaming reproduction, file reproduction, and broadcast wave decoding. In the following description, the types of contents having such different reproduction means are referred to as contents attributes.

The contents output apparatus 100a includes an acquisition section 110a, the input section 120, the storage section 130, the output section 140, the output control section 150, and the contents read-ahead control device 200a. Here, those given with reference characters identical to the first embodiment conduct operations that are identical to those of the first embodiment, and thereby descriptions of those are omitted.

Figure 15:
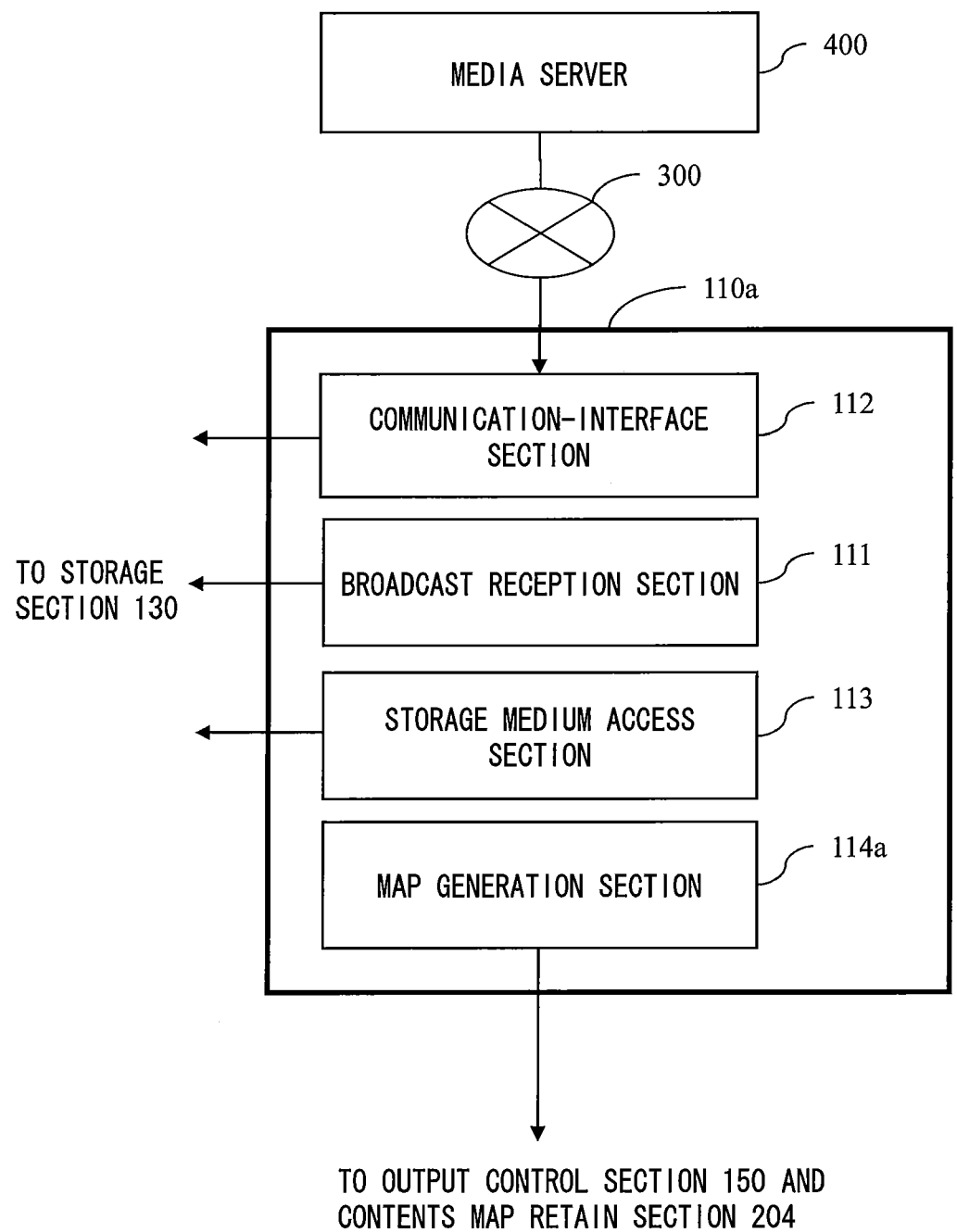
FIG. 15 shows an internal configuration of an acquisition section 110a in the second embodiment of the present invention.

When compared to the acquisition section 110 of the first embodiment, the acquisition section 110a differs in that the acquisition section 110a can acquire contents having various contents attributes. FIG. 15 shows an internal configuration of the acquisition section 110a. The acquisition section 110a includes the broadcast reception section 111, a communication-interface section 112, a storage medium access section 113, and a map generation section 114a. Here, those given with reference characters identical to the first embodiment conduct operations that are identical to those of the first embodiment, and thereby descriptions of those are omitted.

The communication-interface section 112 is connected to the media server 400 that distributes streamed videos via a network 300. Representatively, the communication-interface section 112 achieves the connection with the network 300 by using a wired LAN (Local Area Network) and a wireless LAN.

Then, the communication-interface section 112 receives video contents transmitted from the media server 400, and buffers the received video contents in the storage section 130. In addition, the communication-interface section 112 acquires a reproduction list describing information that uniquely specifies a video content on the network. The information that uniquely specifies a video content includes, for example, a URL (Uniform Resource Locator) and the like. Preferably, the communication-interface section 112 accesses the media server 400 every time the contents output apparatus 100a starts up, and newly acquires a reproduction list regarding a video list including the latest streamed videos.

The media server 400 is located inside or outside one's home, and is a server that distributes video contents through streaming. The network 300 that accesses a media server inside home typically refers to an intranet. The communication-interface section 112 and the media server 400 inside home communicate with each other by protocols including that of DLNA (Digital Living Network Alliance). The network 300 that accesses a media server outside home typically refers to the Internet. The communication-interface section 112 and the media server 400 outside home communicate with each other by protocols including that of WWW (World Wide Web).

The storage medium access section 113 accesses storage media including a memory card that is inserted in the contents output apparatus 100a, and a hard disk that is built in the contents output apparatus 100a; and acquires a content. Furthermore, when the input section 120 receives a recording operation by the user, the storage medium access section 113 responds to a request by the output control section 150 and stores, on a storage medium, a video content downloaded via broadcast waves or a network. In addition, the storage medium access section 113 acquires a reproduction list describing information that uniquely specifies a content stored on the storage medium. The information that uniquely specifies a content includes, for example, a file path and the like.

Figure 16:
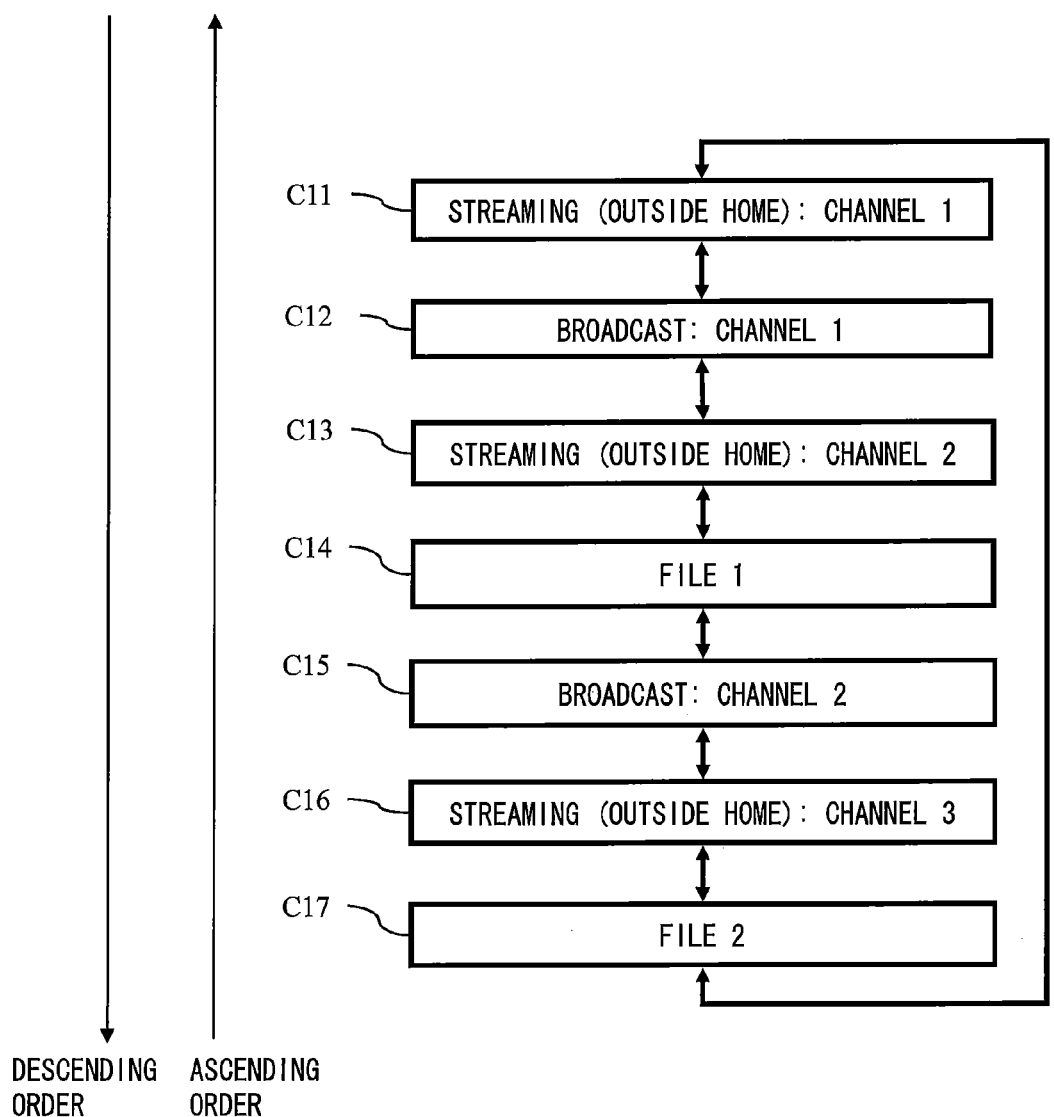
FIG. 16 is a conceptual diagram of a contents map according to the second embodiment of the present invention.

The map generation section 114a generates a contents map 119a from the above described electronic program guide and reproduction list. FIG. 16 shows a conceptual diagram of the contents map 119a according to the second embodiment.

The contents map shown in FIG. 16 indicates an example in which the above described electronic program guide and reproduction list are arranged in a single dimension. Similar to FIG. 3, in this example, when viewing is conducted through channel zapping by the user, the channel switching operation is only conducted in an ascending order or a descending order shown in FIG. 16. Furthermore, the user switches the channels one by one in an arrow direction in the ascending order or the descending order by a single channel switching operation.

Multiple video contents having different contents attribute are arranged in the contents map in accordance with a sequential order determined for each contents output apparatus 100a. Specifically, arranging is conducted depending on the popularity of video contents, a chronological order of broadcasting, or the contents attribute. It should be noted that, in a contents map sorted by the contents attribute, if a content reproduced through streaming from the media server 400 is downloaded on an internal hard disk by another means, the contents attribute of the content changes.

The map generation section 114a newly generates the contents map 119a when the communication-interface section 112 or the storage medium access section 113 newly acquires a reproduction list. In addition, the map generation section 114a newly generates the contents map 119a when accessible contents are changed. A change in the accessible contents occurs by a change in the network status obtained from the communication-interface section 112, attachment or detachment of the memory card informed from the storage medium access section 113, and erasing of contents by the user.

The acquisition section 110a transmits the contents map 119a generated as described above to the output control section 150 and the contents read-ahead control device 200a.

Figure 17:
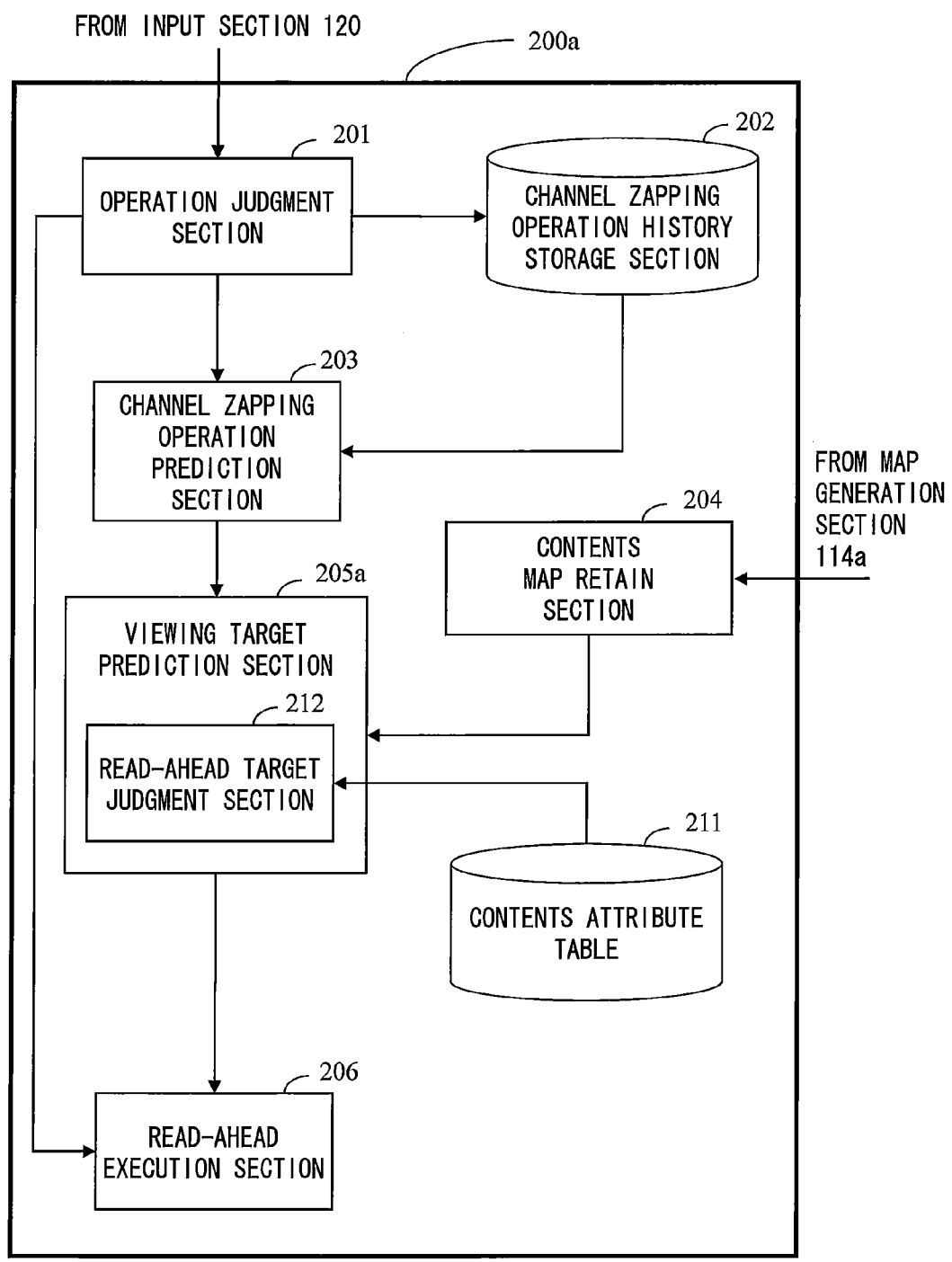
FIG. 17 shows an internal configuration of the contents read-ahead control device 200a of the present invention.

An internal configuration of the contents read-ahead control device 200a according to the second embodiment will be described in detail next by using FIG. 17. The contents read-ahead control device 200a includes the operation judgment section 201, the channel zapping operation history storage section 202, the channel zapping operation prediction section 203, the contents map retain section 204, a viewing target prediction section 205a, the read-ahead execution section 206, and a contents attribute table 211. In addition, the viewing target prediction section 205a includes a read-ahead target judgment section 212. Here, those given with reference characters identical to the first embodiment conduct operations that are identical to those of the first embodiment, and thereby descriptions of those are omitted.

The contents attribute table 211 is a table showing correspondence of an attribute of a content and a time required to start a reproduction of the content. FIG. 18 shows one example of a contents attribute table.

"Streaming (inside home)" is a contents attribute for video contents distributed through streaming from a media server at home via an intranet. Furthermore, "streaming (outside home)" is a contents attribute for video contents distributed through streaming from a media server outside home via the Internet. "File" is a contents attribute of video contents stored in the storage medium via the storage medium access section 113. "Broadcast" is a contents attribute for video contents that are transmitted from broadcasting stations.

For each of the contents attributes, the time necessary to start reproduction of a content is described as a load time, which is an average of 3000 ms for "streaming (outside home)," an average of 2000 ms for "streaming (inside home)," around 200 ms for "broadcast," and in which instantaneous reproduction is possible for "file". Numerical values and contents attributes shown in the present second embodiment are examples. In particular, the time necessary to start reproduction for "streaming (outside home)" or "streaming (inside home)" depends on network environments.

The read-ahead target judgment section 212 acquires a contents attribute of a video content positioned in the periphery of a channel predicted to be switched on next, based on the channel zapping operation predicted by the channel zapping operation prediction section 203. Then, the read-ahead target judgment section 212 refers to the contents attribute table 211, and specifies the time necessary for buffering each content based on the contents attribute. Furthermore, the read-ahead target judgment section 212 excludes channels that do not require a read-ahead because of having a short required time for buffering. Furthermore, if the capacity of the storage section 130 will be surpassed when the channels remaining after excluding the channels that do not require a read-ahead are all buffered, the read-ahead target judgment section 212 preferentially selects a channel requiring a long time for buffering.

The viewing target prediction section 205a is one that additionally conducts the process content of the read-ahead target judgment section 212, in addition the process content of the viewing target prediction section 205 of the first embodiment.

Operations of the contents output apparatus 100a configured as described above when starting the read-ahead of video contents will be described by using FIG. 19 to FIG. 22.

Figure 19:
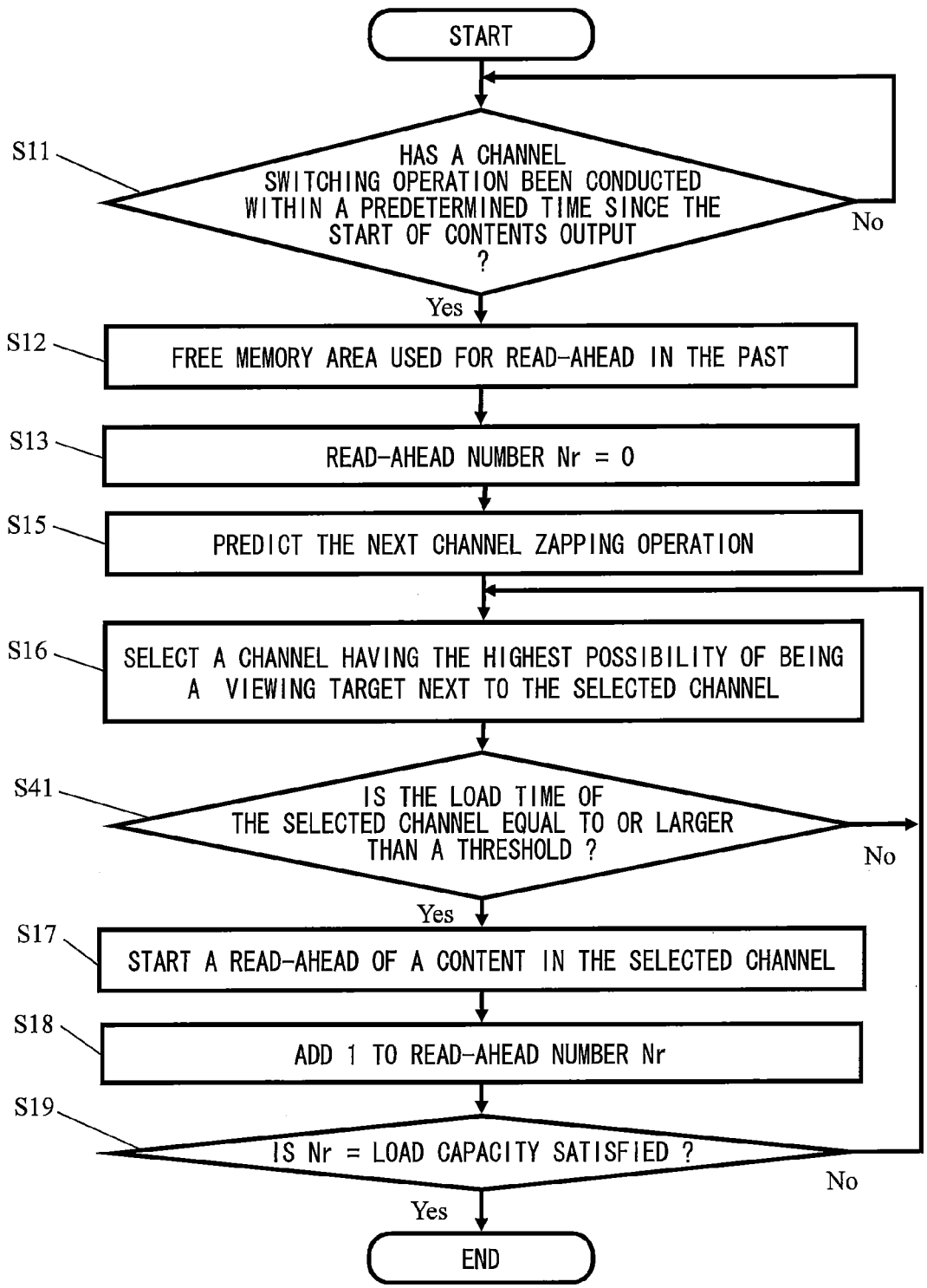
FIG. 19 is a flowchart showing one example of operations of the contents read-ahead control device 200a when starting a read-ahead of video contents.

FIG. 19 is a flowchart showing one example of operations of the contents read-ahead control device 200a when starting the read-ahead of video contents. Here, operations that are identical to those in FIG. 7 are given identical reference characters, and thereby descriptions of those are omitted.

When a channel is selected by the viewing target prediction section 205a at step S16, the read-ahead target judgment section 212 judges whether the load time of the channel is equal to or greater than a threshold (step S41). This threshold is a value close to 0, and is configured in accordance with the mode of usage of the user, and is stored in the read-ahead target judgment section 212 in advance.

When the load time is shorter than the threshold (No at step S41), the process at step S16 is executed once again. When the load time is equal to or larger than the threshold (Yes at step S41), the read-ahead execution section 206 executes the operations subsequent to step S17.

Figure 20:
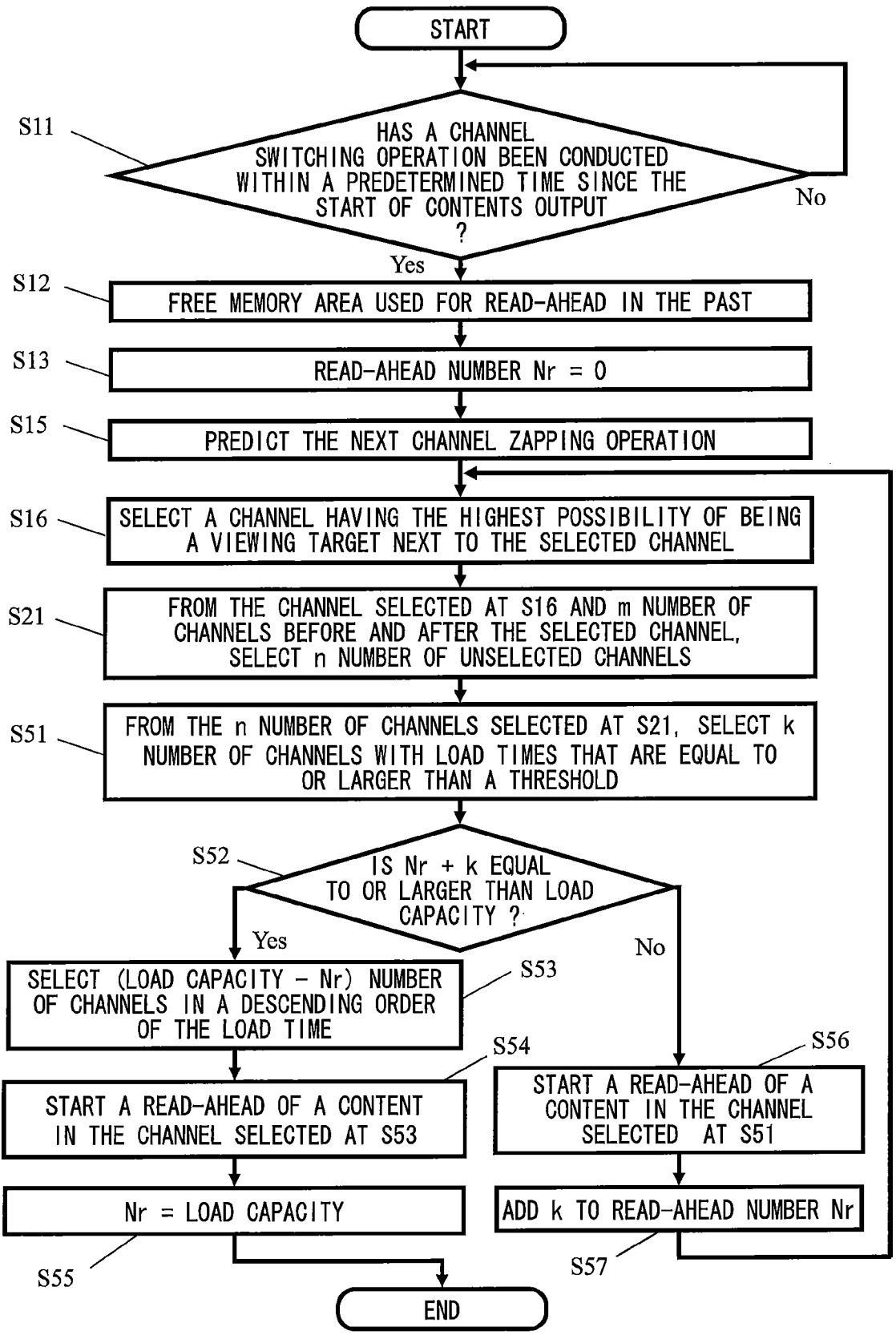
FIG. 20 is a flowchart showing one example of operations of the contents read-ahead control device 200a when starting a read-ahead of video contents.

FIG. 20 is a flowchart showing one example of operations of the contents read-ahead control device 200a of the second embodiment, in which improvements have been made with regard to an influence of a deviation of a channel zapping operation by the user. In FIG. 20, operations that are identical to those in FIG. 8 are given identical reference characters, and thereby descriptions of those are omitted. In the following, operations that are different from those in FIG. 8 are described in detail.

At step S21, the viewing target prediction section 205a selects n number of channels. Next, based on the contents attributes of the video contents of the n number of channels, the read-ahead target judgment section 212 refers to the contents attribute table 211 and acquires load times (step S51). Then, among the video contents in the n number of channels, the read-ahead target judgment section 212 selects a channel having a load time equal to or larger than a threshold. This threshold is identical to the threshold at step S41 in FIG. 19. In the following description, k will be used as the number of channels selected at step S51.

Next, the viewing target prediction section 205a judges whether Nr+k is equal to or greater than a load capacity (step S52). This load capacity is identical to the load capacity at step S22 in FIG. 8.

When Nr+k is equal to or greater than the load capacity (Yes at step S52), the read-ahead target judgment section 212 executes the process at step S53. Next, among the k number of channels selected at step S51, the read-ahead target judgment section 212 selects (load capacity−Nr) number channels in a descending order of the load time (step S53). Then, the read-ahead execution section 206 starts a read-ahead of a content of a channel selected at step S53 (step S54), and assigns Nr as the load capacity (step S55).

When Nr+k is smaller than the load capacity (No at step S52), the read-ahead execution section 206 starts a read-ahead of contents in the k number of channels selected at step S51 (step S56). Then, the read-ahead execution section 206 adds k to Nr (step S57). The process at step S16 is executed when the read-ahead execution section 206 executes the operation at step S57.

Figure 21:
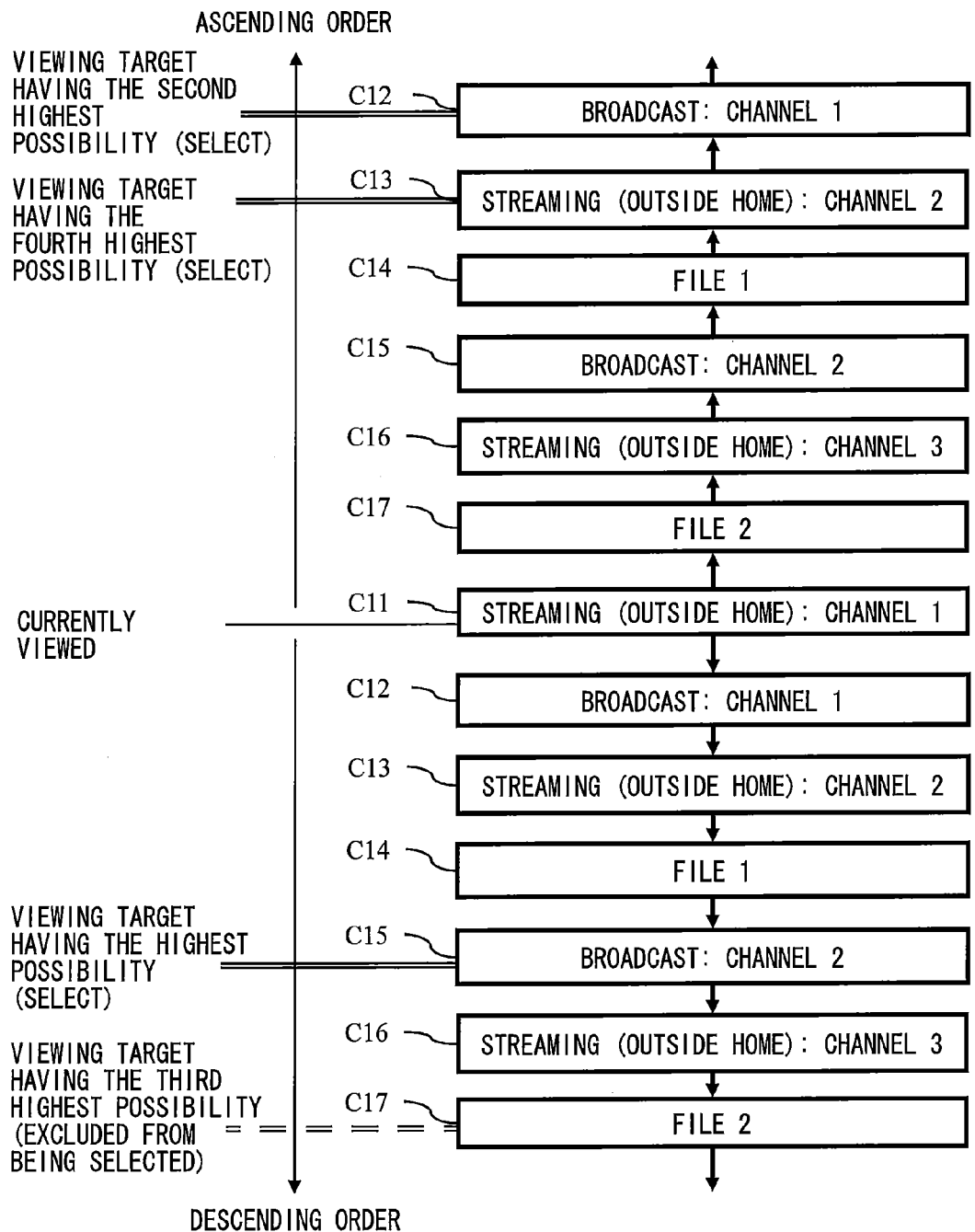
FIG. 21 shows a specific example for describing contents of operations subsequent to step S16 in FIG. 19.

Next, contents of operations subsequent to step S16 in FIG. 19 and FIG. 20 will be described in detail by using specific examples in FIG. 9, FIG. 21, and FIG. 22. FIG. 21 shows a specific example for describing contents of operations subsequent to step S16 in FIG. 19. In FIG. 21, for convenience of description, each of the channels is given reference characters of C11 to C17 corresponding to each of the channels in FIG. 16. Furthermore, the prediction result shown in FIG. 9 is obtained at step S15 in FIG. 19, and the currently viewed channel is C11. Furthermore, the load capacity at step S19 in FIG. 19 is 3. Furthermore, the contents attribute table 211 that is referred at step S41 in FIG. 19 is that shown in FIG. 18, and the threshold at step S41 is 30 ms.

At step S16, the viewing target prediction section 205a recognizes that a channel zapping operation having the maximum appearance probability is "+4" from the prediction result in FIG. 9. Therefore, the viewing target prediction section 205a selects C15, which is the fourth channel from C11 in the descending order, as a channel having the highest possibility of being a viewing target.

Next, at step S41, the read-ahead target judgment section 212 refers to the contents attribute table 211 in FIG. 18 and acquires a load time (200 ms), since the contents attribute of C15 selected at step S16 is "broadcast". Then, since this load time is equal to or longer than the threshold of 30 ms, the read-ahead target judgment section 212 makes a judgment of "Yes" at step S41.

In addition, at step S17, the read-ahead execution section 206 starts a read-ahead of a content in C15. Then, at step S18, the read-ahead execution section 206 adds 1 to the read-ahead number Nr. Here, since the value of Nr is set to 0 at step S13, Nr=1 is derived. Since this Nr is less than the load capacity of 3, the read-ahead execution section 206 makes a judgment of "No" at step S19.

Next, returning to step S16, the viewing target prediction section 205a recognizes that a channel zapping operation having the second highest appearance probability is "−6" from the prediction result in FIG. 9. Therefore, the viewing target prediction section 205a selects C12, which is the sixth channel from C11 in the ascending order, as a channel having a high possibility of being a viewing target next to the already selected C15.

Next, at step S41, the read-ahead target judgment section 212 refers to the contents attribute table 211 in FIG. 18 and acquires a load time (200 ms), since the contents attribute of C12 selected at step S16 is "broadcast". Then, since this load time is equal to or longer than the threshold of 30 ms, the read-ahead target judgment section 212 makes a judgment of "Yes" at step S41.

In addition, at step S17, the read-ahead execution section 206 starts a read-ahead of a content in C12. Then, at step S18, the read-ahead execution section 206 adds 1 to the read-ahead number Nr to derive Nr=2. Since this Nr is less than the load capacity of 3, the read-ahead execution section 206 makes a judgment of "No" at step S19.

Next, returning to step S16 again, the viewing target prediction section 205a recognizes that a channel zapping operation having the third highest appearance probability is "+6" from the prediction result in FIG. 9. Therefore, the viewing target prediction section 205a selects C17, which is the sixth channel from C11 in the descending order, as a channel having a high possibility of being a viewing target after the already selected C15 and C12.

Next, at step S41, the read-ahead target judgment section 212 refers to the contents attribute table 211 in FIG. 18 and acquires a load time (0 ms), since the contents attribute of C17 selected at step S16 is "file". Then, since this load time is shorter than the threshold of 30 ms, the read-ahead target judgment section 212 makes a judgment of "No" at step S41.

Thus, the process returns to step S16, and a channel zapping operation having the fourth highest appearance probability is selected from FIG. 9. Although "−5" and "−7" both correspond to such a channel zapping operation, the viewing target prediction section 205a excludes channel C11 from being a selection target since the seventh channel from C11 in the ascending order is the currently viewed channel C11. Therefore, the viewing target prediction section 205a selects C13, which is the fifth channel from C11 in the ascending order, as a channel having a high possibility of being a viewing target after the already selected C15, C12, and C17.

Next, at step S41, the read-ahead target judgment section 212 recognizes that the contents attribute of C13 selected at step S16 is "streaming (outside home)". Then, the read-ahead target judgment section 212 refers to the contents attribute table 211 in FIG. 18 and acquires a load time (3000 ms). Furthermore, since this load time is equal to or longer than the threshold of 30 ms, the read-ahead target judgment section 212 makes a judgment of "Yes" at step S41.

In addition, at step S17, the read-ahead execution section 206 starts a read-ahead of a content in C13 selected at step S16. Then, at step S18, the read-ahead execution section 206 adds 1 to the read-ahead number Nr to derive Nr=3. Since this Nr matches the load capacity of 3, the read-ahead execution section 206 makes a judgment of "Yes" at step S19. Then, the contents read-ahead operation ends.

Figure 22:
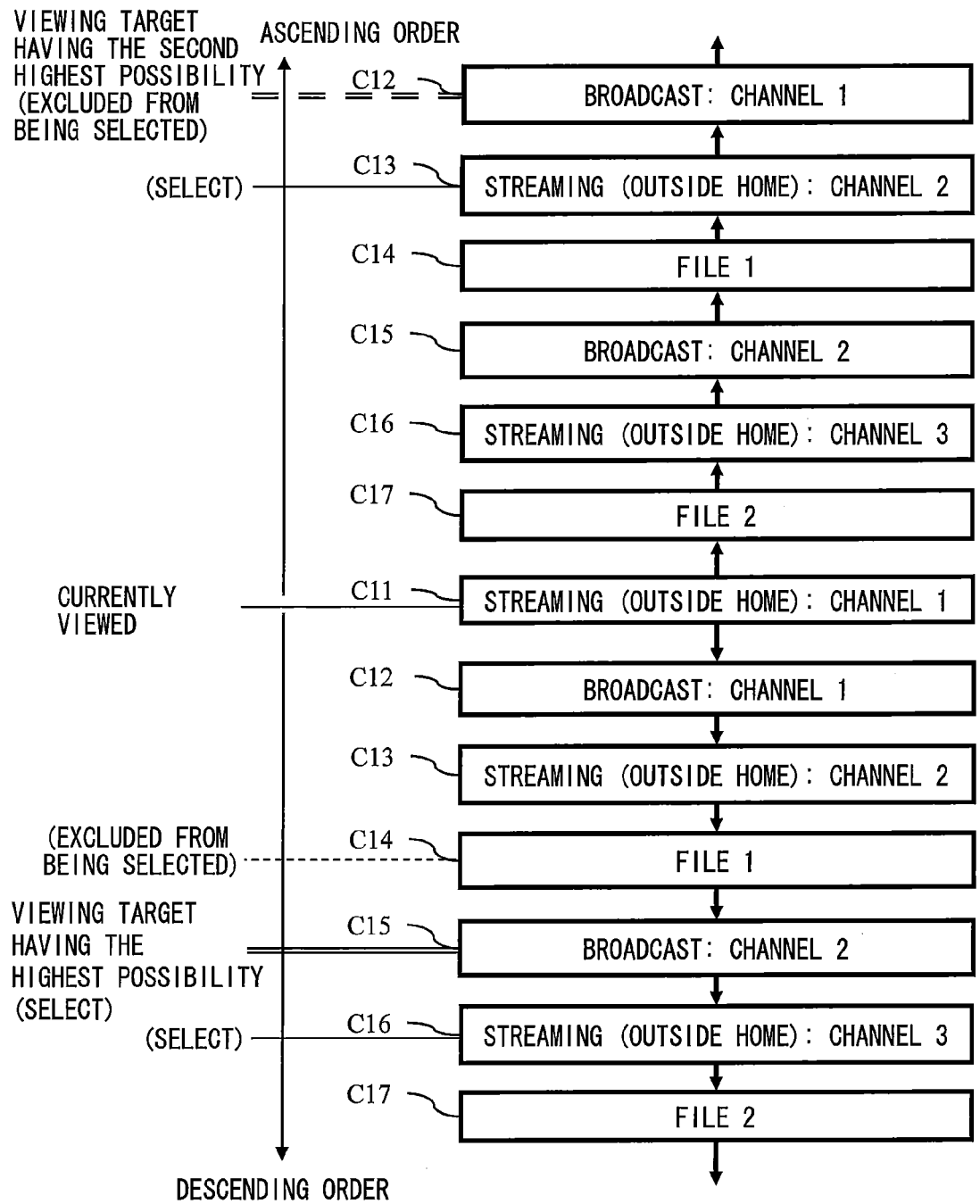
FIG. 22 shows a specific example for describing contents of operations subsequent to step S16 in FIG. 20.

FIG. 22 shows a specific example for describing contents of operations subsequent to step S16 in FIG. 20. In FIG. 22, each of the channels is given reference characters of C11 to C17 corresponding to each of the channels in FIG. 16. In FIG. 22, the prediction result shown in FIG. 9 is obtained at step S15 in FIG. 20, and the currently viewed channel is channel C11. Furthermore, the value m at step S21 in FIG. 20 is 1, and the load capacity in steps subsequent to step S52 in FIG. 21 is 3. Furthermore, the contents attribute table 211 that is referred at step S51 in FIG. 21 is that shown in FIG. 18, and the threshold at step S51 is 30 ms.

At step S16, the viewing target prediction section 205a recognizes that a channel zapping operation having the maximum appearance probability is "+4" from the prediction result in FIG. 9. Therefore, the viewing target prediction section 205a selects C15, which is the fourth channel from C11 in the descending order, as a channel having the highest possibility of being a viewing target.

Next, at step S21, the viewing target prediction section 205a selects C14 and C16, which are channels before or after C15 by one. Here, since channels C14 to C16 are channels that are not currently viewed and have not been selected yet, the viewing target prediction section 205a selects all of C14 to C16.

Next, at step S51, the read-ahead target judgment section 212 recognizes that the contents attributes of C14, C15, and C16 selected at step S21 are respectively "file", "broadcast", and "streaming (outside home)". Then, the read-ahead target judgment section 212 refers to the contents attribute table 211 in FIG. 18 and acquires respective load times (0 ms, 200 ms, and 3000 ms). Furthermore, the read-ahead target judgment section 212 selects C15 and C16 which have load times that are equal to or longer than the threshold of 30 ms. Therefore, the value k at step S51 becomes 2.

In addition, at step S52, the viewing target prediction section 205a calculates the value of Nr+k. Here, since the value of Nr is set to 0 at step S13, Nr+k=2 is derived and Nr+k will be less than the load capacity of 3. Therefore, the viewing target prediction section 205a makes a judgment of "No" at step S52.

Then, at step S56, the read-ahead execution section 206 starts a read-ahead for contents in C15 and C16, which are selected at step S51. Next, at step S57, the read-ahead execution section 206 adds 2 to Nr.

Next, returning to step S16, the viewing target prediction section 205a recognizes that a channel zapping operation having the second highest appearance probability is "−6" from the prediction result in FIG. 9. Therefore, the viewing target prediction section 205a selects C12, which is the sixth channel from C11 in the ascending order, as a channel having a high possibility of being a viewing target next to the already selected C15.

In addition, at step S21, from among C12, which has been selected, and C11 and C13, which are channels before and after C12, the viewing target prediction section 205a selects C12 and C13, excluding the currently viewed C11.

Next, at step S51, the read-ahead target judgment section 212 recognizes that the contents attributes of C12 and C13 selected at step S21 are respectively "broadcast" and "streaming (outside home)". Then, the read-ahead target judgment section 212 refers to the contents attribute table 211 in FIG. 18 and acquires respective load times (200 ms and 3000 ms). Furthermore, the read-ahead target judgment section 212 selects C12 and C13 which have load times that are equal to or longer than the threshold of 30 ms. Therefore, the value k at step S51 becomes 2.

Then, at step S52, Nr+k=4 is derived, and since this is more than the load capacity, the viewing target prediction section 205a makes a judgment of "Yes".

Then, at step S53 the read-ahead target judgment section 212 selects (load capacity−Nr) number of channels, that is, one channel, in a descending order of the load time. Here, the read-ahead target judgment section 212 selects C13, since C13 has a longer load time.

Next, at step S54, the read-ahead execution section 206 starts a read-ahead of a content in C13 selected at step S53. Then, at step S55, the read-ahead execution section 206 changes Nr to the load capacity of 3. Then, the contents read-ahead operation ends.

In addition to the operations of the contents read-ahead control device according to the first embodiment, the contents read-ahead control device according to the present embodiment is applicable to video contents having different contents attributes, such as broadcast wave decoding, streaming reproduction, and the like. Therefore, the present contents read-ahead control device can prioritize contents having a long load time, in order to conduct a read-ahead among the video contents having different contents attributes. Therefore, the contents output apparatus including the present contents read-ahead control device can effectively shorten the time before an output of contents start, even when the user suddenly switches to a channel distant from a currently viewed channel by conducting a channel zapping operation.

It should be noted that, at step S53 in FIG. 20, when a plurality of contents having the same load time exist and when (load capacity−Nr) number of channels cannot be selected; the priority order of the channels is arbitrary set. For example, at step S16, a channel near the selected channel may be prioritized to be selected. Furthermore, the priority order may be determined in accordance with the user's preference or a degree of popularity.

Furthermore, when the accessible contents are changed, the map generation section 114a may generate only a part of the contents map 119a that has been changed. A change in the accessible contents occurs by a network status obtained from the communication-interface section 112, attachment or detachment of the memory card informed from the storage medium access section 113, and erasing of contents by the user. In this case, the acquisition section 110a transmits the changed part of the contents map 119a to the output control section 150 and the contents read-ahead control device 200a. Then, the output control section 150 and the contents map retain section 204 of the contents read-ahead control device 200a newly generates the contents map 119a based on information regarding the changed part of the contents map 119a.

When the contents map 119a is generated as described above, there may be a case where updating of the contents map 119a is not conducted by the time the read-ahead execution section 206 conducts a read-ahead on a content as at step S17 in FIG. 19, at step S54 in FIG. 20, and the like. In such a case, although a content may exists in the contents map 119a, the content will not exist in reality. For such a case, instead of proceeding with the read-ahead, the read-ahead execution section 206 may conduct a read-ahead on a content in the next channel.

Figure 23:
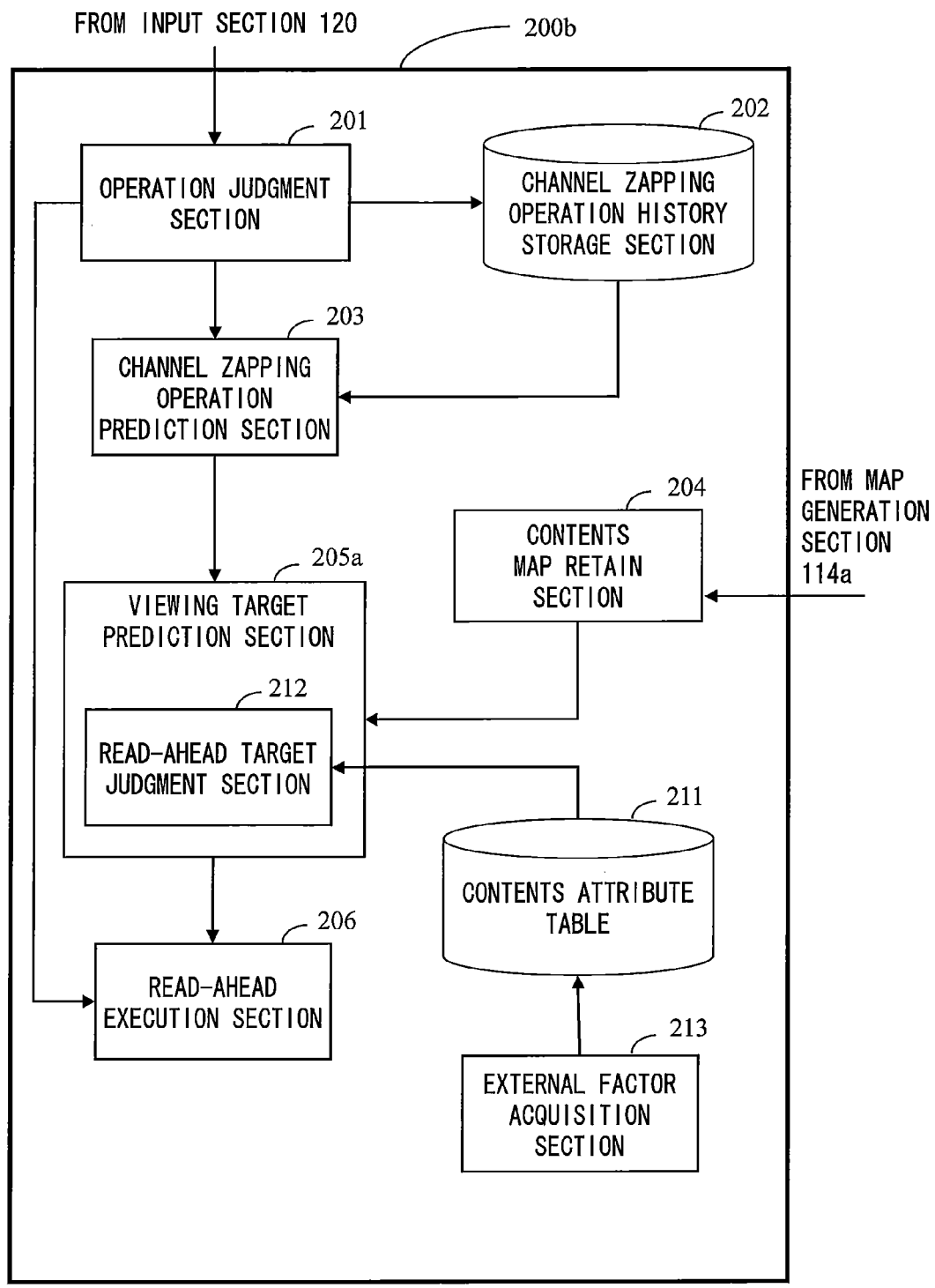
FIG. 23 shows an internal configuration of a contents read-ahead control device 200b according to an alternate example of the second embodiment of the present invention.

An alternate example of the second embodiment will be described next by using FIG. 23. FIG. 23 is an internal configuration of a contents read-ahead control device 200b according to an alternate example of the second embodiment. The contents read-ahead control device 200b includes the operation judgment section 201, the channel zapping operation history storage section 202, the channel zapping operation prediction section 203, the contents map retain section 204, the viewing target prediction section 205a, the read-ahead execution section 206, the contents attribute table 211, and an external factor acquisition section 213. In addition, the viewing target prediction section 205a includes the read-ahead target judgment section 212. Those given with reference characters identical to the second embodiment conduct operations that are identical to those in the second embodiment, and thereby descriptions of those are omitted.

The external factor acquisition section 213 periodically measures a data reception condition in the network, and when the reception condition is changed, changes the time necessary for buffering, and updates the contents attribute table 211. The load time of a content depends on the bit rate for reproducing the content, file size of the content, and a network environment. Therefore, the external factor acquisition section 213 conducts an update to obtain the necessary load time based on the file size, bit rate, and the like of each content, and the network environment.

In the alternate example of the second embodiment, since the time required for buffering is changed by the external factor acquisition section 213 in accordance with a change in the network, a contents read-ahead with higher accuracy can be achieved.

Third Embodiment

Figure 24:
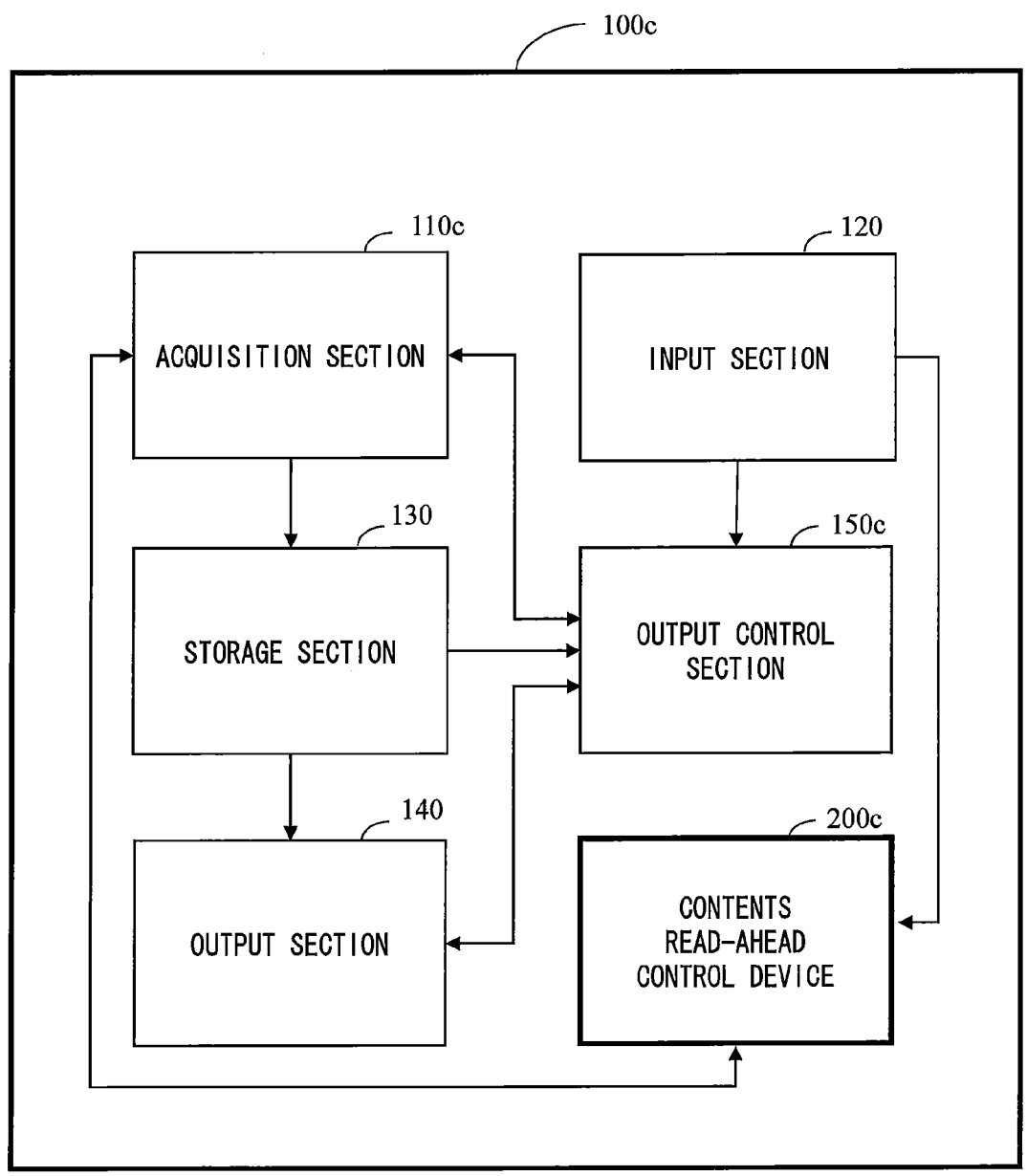
FIG. 24 shows the overall configuration of a contents output apparatus 100c including a contents read-ahead control device 200c according to a third embodiment of the present invention.

FIG. 24 shows the overall configuration of a contents output apparatus 100c including a contents read-ahead control device 200c of a third embodiment of the present invention. The contents output apparatus 100c is a television or a mobile terminal that is to be carried outside home, and both of which include a contents map in two dimensions in addition to the functions of the contents output apparatus 100a. Furthermore, with the contents output apparatus 100c, the user can conduct a channel zapping in two dimensions by key operations of upward, downward, leftward, rightward, and the like.

The contents output apparatus 100c includes an acquisition section 110c, the input section 120, the storage section 130, the output section 140, an output control section 150c, and the contents read-ahead control device 200c. Here, those given with reference characters identical to the first embodiment conduct operations that are identical to those of the first embodiment, and thereby descriptions of those are omitted.

Figure 25:
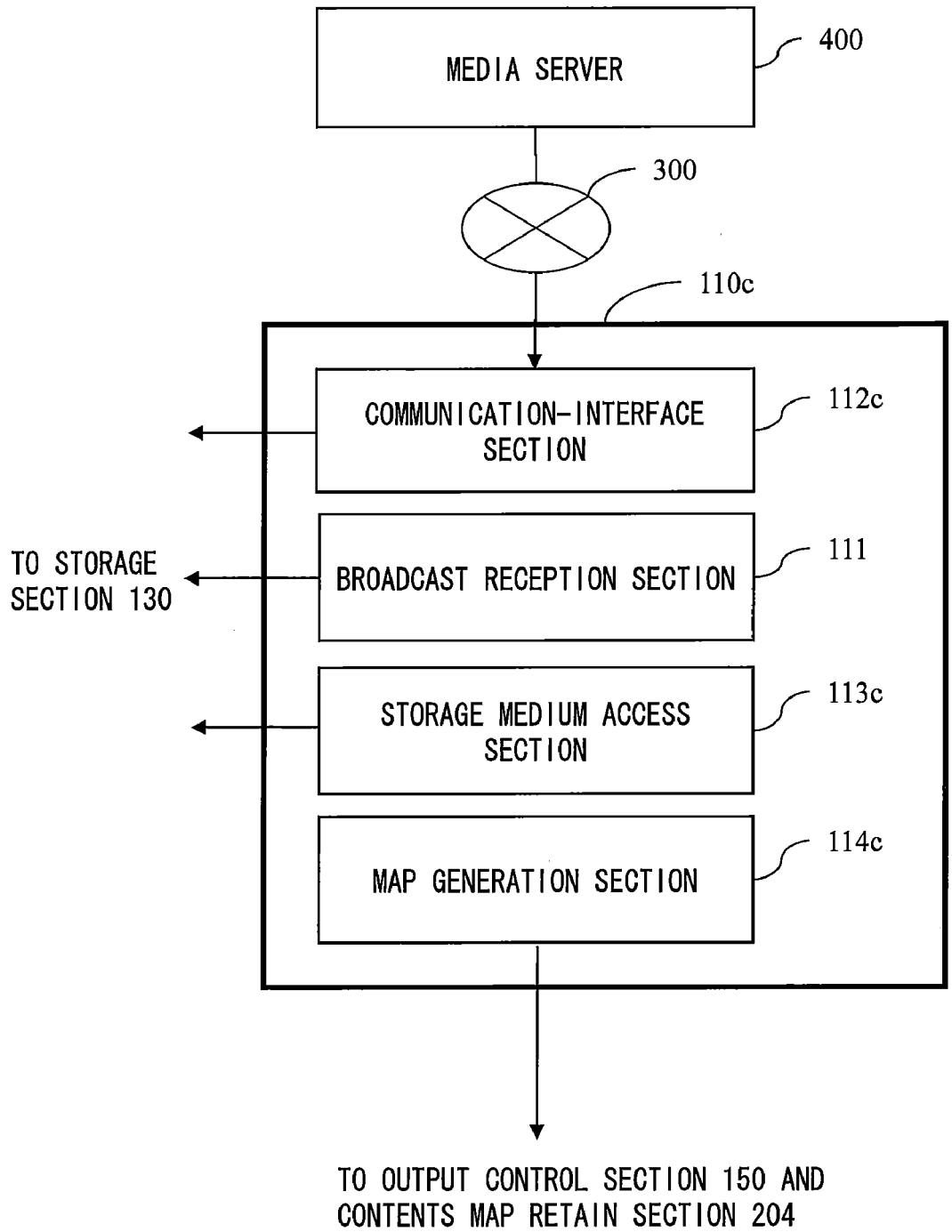
FIG. 25 shows an internal configuration of an acquisition section 110c according to the third embodiment of the present invention.

FIG. 25 is a drawing showing an internal configuration of the acquisition section 110c. The acquisition section 110c includes the broadcast reception section 111, a communication-interface section 112c, a storage medium access section 113c, and a map generation section 114c. Here, the broadcast reception section 111 conducts operations identical to that of the second embodiment; and thereby a description thereof is omitted.

When compared to the communication-interface section 112 and the storage medium access section 113 of the second embodiment, the communication-interface section 112c and the storage medium access section 113c are different in that the information in the reproduction list is acquired from the media server. In the second embodiment, information that uniquely specifies each of the video contents is described in the reproduction list. However, in the third embodiment, a set of contents are grouped as one, and information that uniquely specifies the group and information that uniquely specifies each of the video contents in the group are described in the reproduction list. Here, a set of contents refers to, for example, those of identical types (videos, still pictures, texts, Web pages, E-mails, etc.), those in the same genre (movies, music, variety shows, etc.), and playlists. Therefore, information uniquely specifying the contents that are in two layers is a characteristic of the third embodiment.

Figure 26:
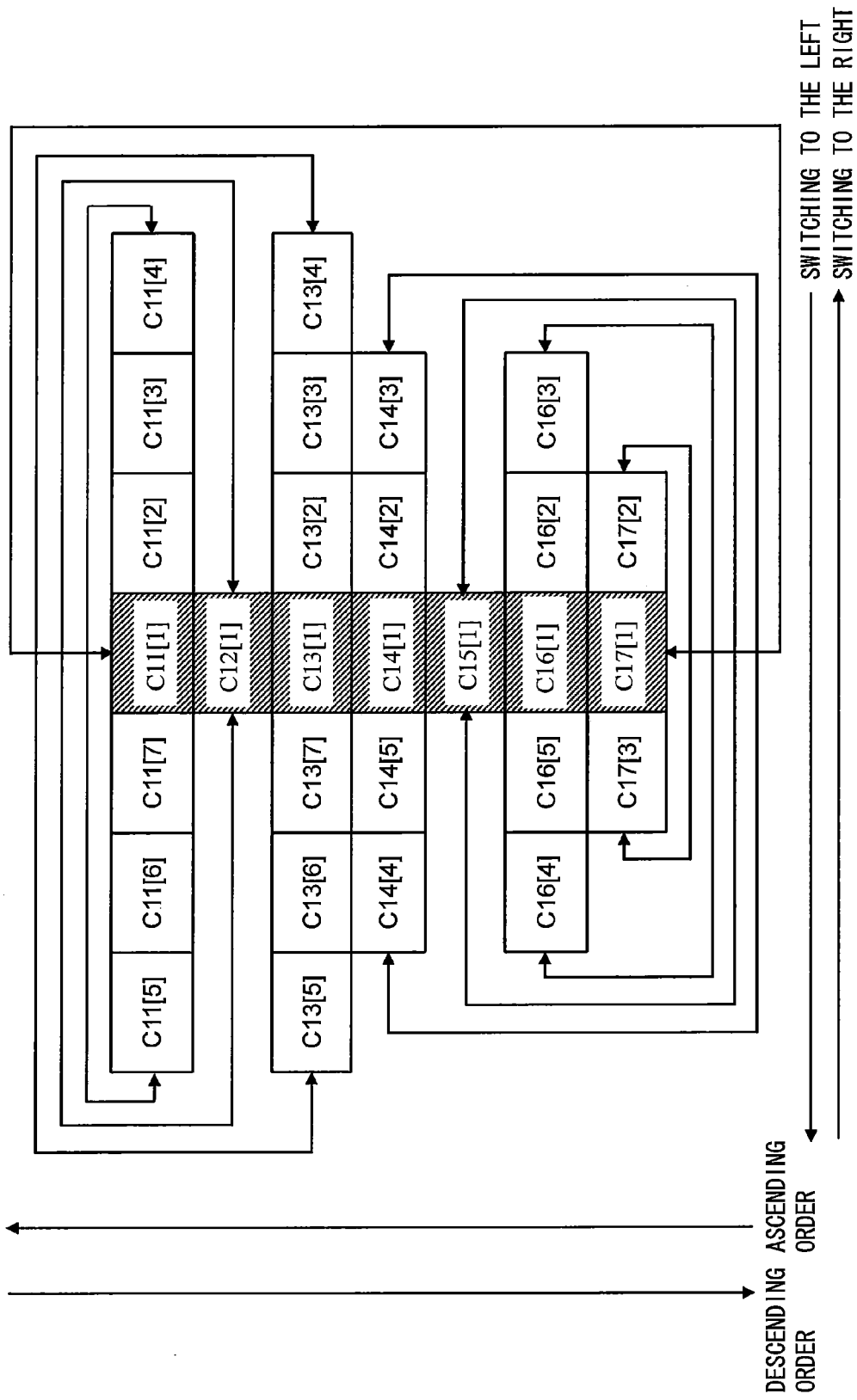
FIG. 26 is a conceptual diagram of a contents map according to the third embodiment of the present invention.

The map generation section 114c generates the above described electronic program guide, and a contents map 119c (not shown) from the reproduction list. The contents map 119c regards the above described group of contents as a single channel, and the contents are managed in respective channels to which the contents belong. FIG. 26 is a conceptual diagram of a contents map according to the third embodiment, and each row indicates the channel described above and each column indicates the contents that belong to respective channels.

C11 to C17 shown in FIG. 26 correspond to channels C11 to C17 in FIG. 16. Among C11 to C17, five channels, excluding C12 and C15 which are broadcast channels, are combined as the group of contents described above, and contents of the respective channels are displayed as an array. For example, C11[1] indicates that it is the first contents of channel C11. It should be noted that, with regard to channels C12 and C15 which are broadcast channels, the contents map is generated so as to include only a single content for each of C12[1] and C15[1] distributed from a broadcasting station.

Furthermore, in FIG. 26, contents that will be outputted when the user switches on the channel are indicated in hatched parts in the central part of the contents map. For example, when a user who is currently viewing channel C14 switches the channel by two in the descending order, the contents output apparatus 100c displays a content C16[1]. Although it will be described later, the contents that will be outputted when the user switches on a channel is not limited to the first content in each of the channels as shown in the example in FIG. 26, and changes depending on a viewing method and a viewing history of the user.

In this example, when viewing is conducted through channel zapping by the user, other than the channel switching operation in the ascending order and descending order shown in FIG. 26, the operation of switching the contents located side by side is conducted. Furthermore, the channels are switched one by one in an arrow direction in the ascending order or descending order by a single channel switching operation. Alternatively, the contents are switched one by one in an arrow direction of either rightward or leftward by a single content switching operation.

In addition, when one of the ends shown in FIG. 26 has been reached by conducting the channel switching operation or the content switching operation, and when further identical switching operation is repeatedly conducted, a channel or content at the other end is read out. For example, when a channel switching operation is further conducted in the descending order after reaching channel C17, the channel switching operation will be conducted in the descending order again starting from channel C11. Furthermore, in channel C14, when a content switching operation is conducted further rightward after an operation of switching to content C14[3], switching to content C14[4] will be conducted.

Furthermore, when the content switching operation is conducted by the output control section 150c which will be described later, the map generation section 114c newly generates a map that is updated based on the content outputted when the user switches the channel. For example, in the contents map in FIG. 26, while viewing content C13[1] in channel C13, the user conducts a content switching operation twice in the rightward direction. In this case, the map generation section 114c generates a contents map that is obtained by shifting the entire contents of channel C13 (i.e., the entire contents of the third row from the top in FIG. 26) in the leftward direction by two.

Furthermore, when the user has viewed a specific content to the end, the map generation section 114c newly generates a map that is updated based on the content outputted when the user switches the channel. For example, in the contents map in FIG. 26, the user views content C13[1] in channel C13 to the end. In this case, the map generation section 114c generates a contents map that is obtained by shifting the entire contents of channel C13 (i.e., the entire contents of the third row from the top in FIG. 26) in the leftward direction by one. In this case, the content viewed by the user next in channel C13 is C13[2].

The acquisition section 110c transmits the contents map 119c generated as described above to the output control section 150c and the contents read-ahead control device 200c.

When compared to the output control section 150 of the first embodiment, the output control section 150c is different in that, when the operation information 121 is information regarding a content switching operation, the output control section 150c causes the acquisition section 110c to buffer, in the storage section 130, a content desired by the user to be viewed.

Figure 27:
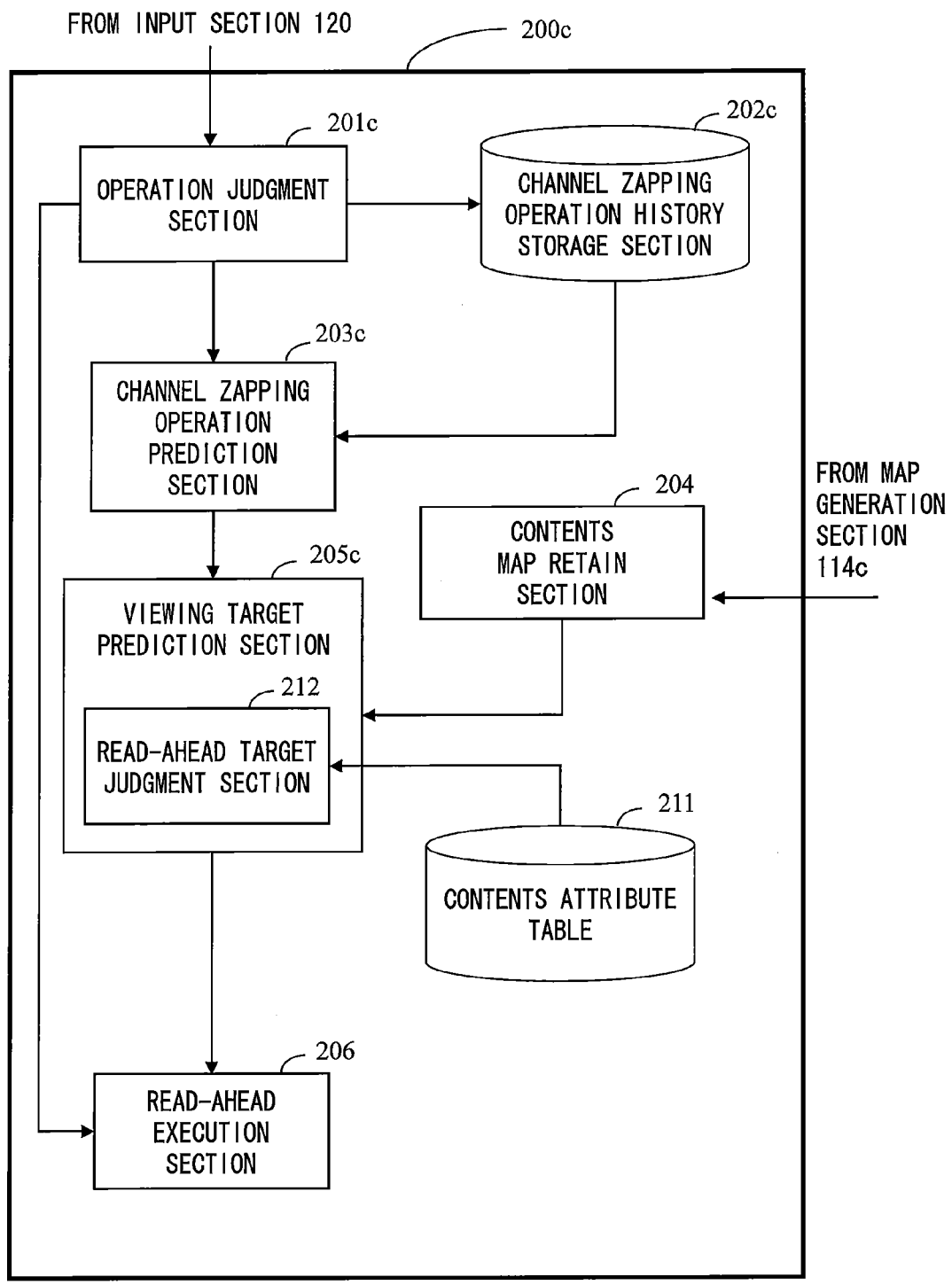
FIG. 27 shows an internal configuration of the contents read-ahead control device 200c according to the third embodiment of the present invention.

Next, an internal configuration of the contents read-ahead control device 200c of the third embodiment will be described in detail by using FIG. 27. The contents read-ahead control device 200c includes an operation judgment section 201c, a channel zapping operation history storage section 202c, a channel zapping operation prediction section 203c, the contents map retain section 204, a viewing target prediction section 205c, the read-ahead execution section 206, and the contents attribute table 211. In addition, the viewing target prediction section 205c includes the read-ahead target judgment section 212. Here, those given with reference characters identical to the second embodiment conduct operations that are identical to those in the second embodiment, and thereby descriptions of those are omitted.

When compared to the operation judgment section 201 of the first embodiment, the operation judgment section 201c differs in that a channel zapping operation is judged also with a content switching operation by the user. A judging method of a channel zapping operation will be described later.

When compared to the channel zapping operation history storage section 202 of the first embodiment, the channel zapping operation history storage section 202c differs in that a channel zapping operation including a content switching operation by the user is also stored.

When compared to the channel zapping operation prediction section 203 of the first embodiment, the channel zapping operation prediction section 203c differs in that the predicted channel zapping operation includes both a channel switching operation and a content switching operation by the user.

When compared to the viewing target prediction section 205a of the second embodiment, the viewing target prediction section 205c differs in the obtained prediction result of a viewing target, since contents of the predicted channel zapping operation are different. Details of this prediction result will be described later.

Figure 28:
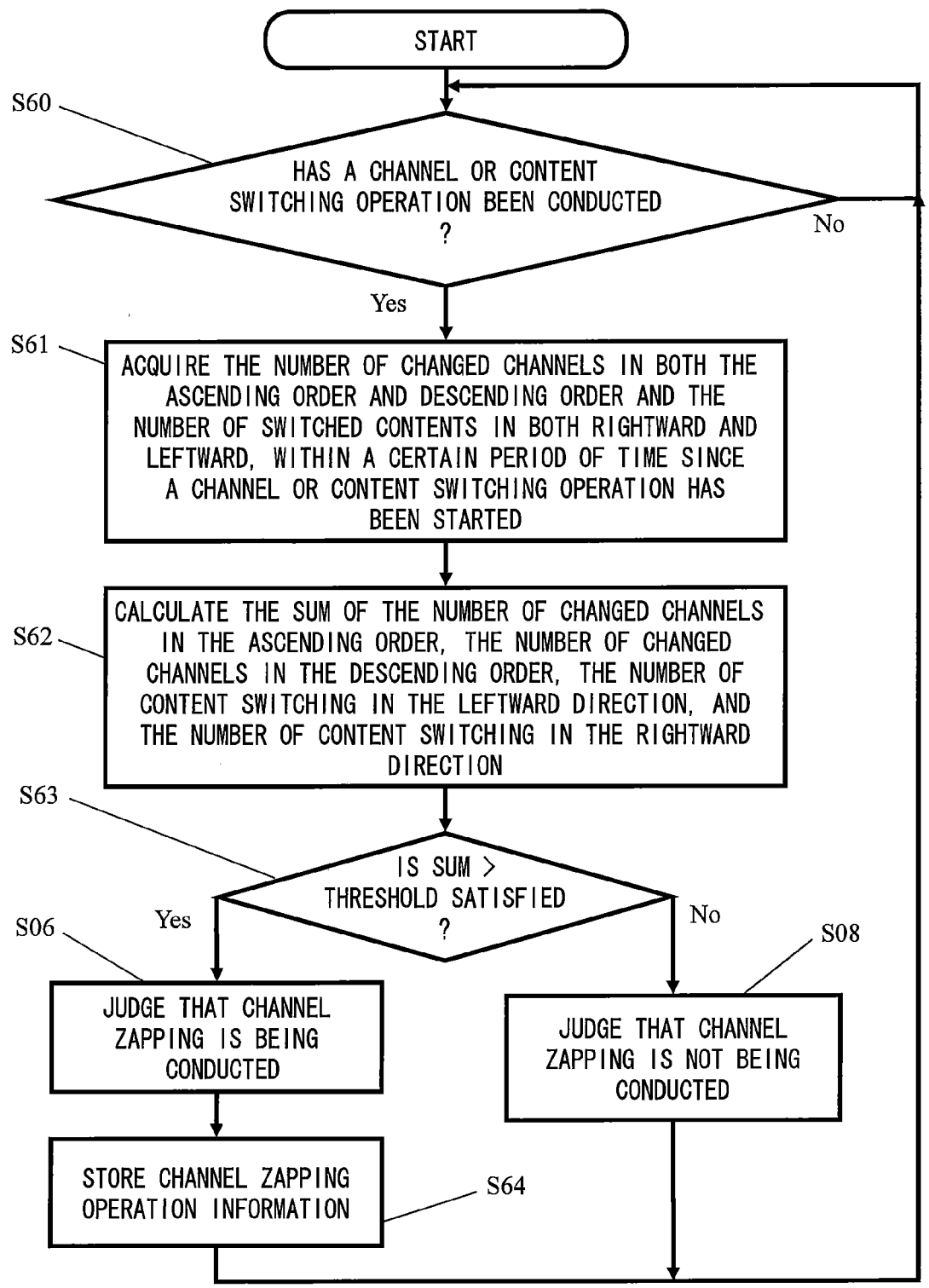
FIG. 28 is a flowchart showing one example of operations of the contents output apparatus 100c according to the third embodiment of the present invention prior to an acquisition of a history of channel zapping operations.

FIG. 28 is a flowchart showing one example of operations the contents output apparatus 100c before an acquisition of a history of channel zapping operations in a case where a channel switching operation by the user is continuously detected at the input section 120. Here, the case, where a channel switching operation by the user is continuously detected at the input section 120, has the same definition as that in FIG. 5. In FIG. 28, processes identical to those in FIG. 5 are given identical reference characters, and thereby descriptions of those are omitted.

In this process, first, the operation judgment section 201c judges whether there is a channel switching operation or a content switching operation that has been conducted (step S60). When there is no channel switching operation or content switching operation (No at step S60), the operation judgment section 201c waits until there is a channel switching operation or a content switching operation.

If it is judged that there is a channel switching operation or a content switching operation by the user (Yes at step S60), the operation judgment section 201c executes the process at step S61. At step S61, the operation judgment section 201c acquires the number of changed channels in both the ascending order and the descending order and the number of switched contents in both rightward and leftward directions, which are inputted in a certain period of time since a channel switching operation or a content switching operation has been started. Then, the operation judgment section 201c calculates a sum of the number of changed channels in the ascending order, the number of changed channels in the descending order, the number of content switching in the leftward direction, and the number of content switching in the rightward direction (step S62).

Next, the operation judgment section 201c judges whether the sum obtained at step S62 is larger than a threshold determined in advance (step S63). If the sum is larger than the threshold (Yes at step S63), the operation judgment section 201c judges that channel zapping is being conducted (step S06). Then, the channel zapping operation history storage section 202c stores information of an operation judged as being a channel zapping operation by the user (step S64). In this case, the channel zapping operation history storage section 202c stores the history of channel zapping operations from a content immediately before the channel zapping to a content at the moment the channel zapping has ended. The stored history is, for example, change directions of channel switching (ascending order, descending order), change directions of content switching (leftward, rightward), the number of channel switching, and the number of content switching.

On the other hand, if the sum is equal to or less than the threshold (No at step S63), the operation judgment section 201c judges that channel zapping is not being conducted (step S08). When the processes at steps S64 and S08 end, the operation judgment section 201c returns to the state at step S60.

It should be noted that, when a channel zapping instruction can be inputted in the input section 120 of the contents output apparatus 100c, step S01 in FIG. 6 may be substituted with step S60 in FIG. 28 for the channel zapping operation judgment process of the operation judgment section 201c.

Figure 29:
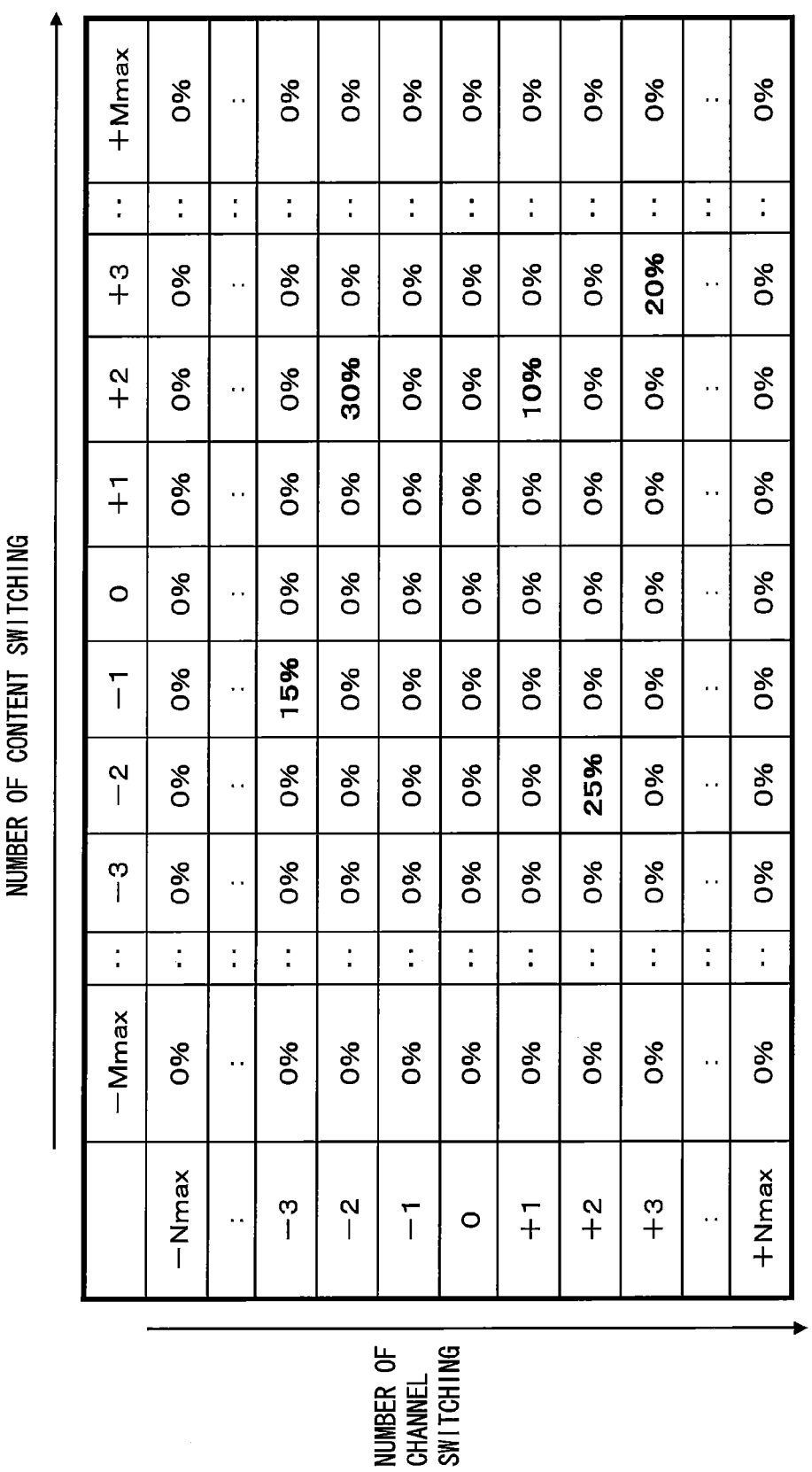
FIG. 29 shows one example of a prediction result obtained from a channel zapping operation prediction section 203c according to the third embodiment of the present invention.

FIG. 29 is a figure showing one example of a prediction result obtained from the channel zapping operation prediction section 203c. The numbers in the left end column of the table in FIG. 29 indicate the number of channel switching conducted by a single channel zapping operation in the ascending order or the descending order. With regard to the plus and minus reference characters in the left end column, "+" represents a movement of channels in the descending order, and "−" represents a movement in the ascending order. The upper end row indicates the number of content switching conducted in the leftward direction or rightward direction by a single channel zapping operation. With regard to the plus and minus reference characters in the upper end row, "+" represents a content switching in the rightward direction, and "−" represents a content switching in the leftward direction. The number represented as a probability in the table represents an appearance probability of a channel zapping operation conducted for the number of channel switching corresponding to that certain column and for the number of content switching corresponding to that certain row. The appearance probability indicates a ratio of a certain channel zapping operation in the entire channel zapping history, which is used to predict the next channel zapping operation at step S15. The channel zapping operation prediction section 203c predicts the next channel zapping operation under an assumption that an operation having a high appearance probability in the past operation history has a high possibility of being conducted next by the user. The maximum value and the minimum value in the leftmost column represented as ±Nmax are respectively the maximum value and the minimum value of the number of channel switching determined in advance by the channel zapping operation prediction section 203c. The maximum value and the minimum value in the top row represented as ±Mmax are respectively the maximum value and the minimum value of the number of content switching determined in advance by the channel zapping operation prediction section 203c. In the following, the appearance probabilities in FIG. 29 are all 0% for the number of channel switching between −Nmax or more but −3 or less and between +3 or more but +Nmax or less, or for the number of content switching between −Mmax or more but −3 or less and between +3 or more but +Mmax or less.

Figure 30:
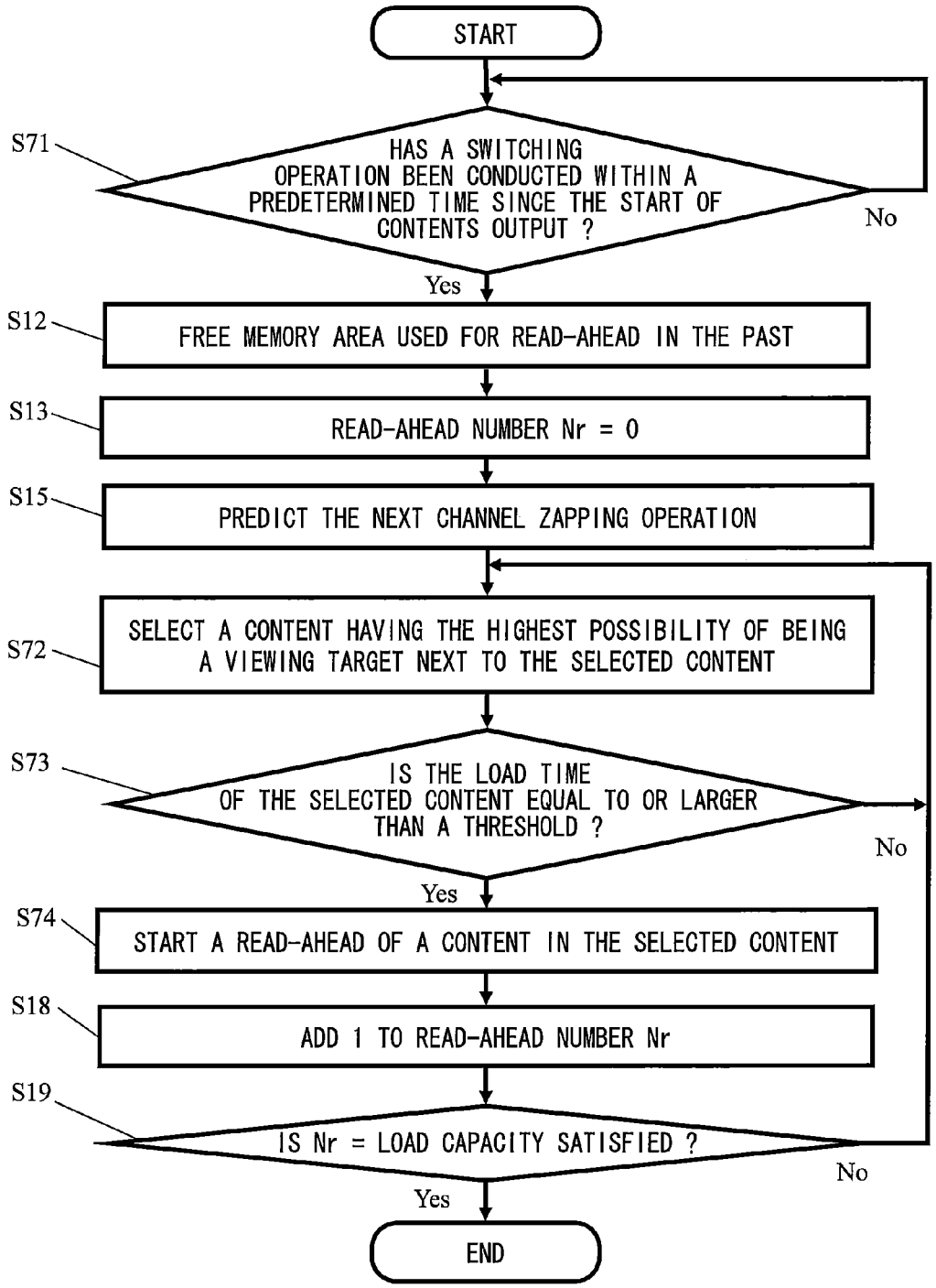
FIG. 30 is a flowchart showing one example of operations of the contents read-ahead control device 200c when starting a read-ahead of video contents.

FIG. 30 is a flowchart showing one example of operations of the contents read-ahead control device 200c when starting a read-ahead of video contents. Here, operations that are identical to those in FIG. 19 are given identical reference characters, and thereby descriptions of those are omitted.

After an output of a content has been started by having the power turned on or by having a channel or a content switched, the operation judgment section 201c first judges whether a channel switching operation or a content switching operation has been conducted within a predetermined time (step S71). Similar to step S11 in FIG. 7, this predetermined time is set to an optimum value in advance for every individual contents output apparatus 100c, and is stored in the contents read-ahead control device 200c. If there is a switching operation within the predetermined time (No at step S71), the operation judgment section 201c waits until there is no switching operations within the predetermined time. The process subsequent to step S71 up to step S15 are identical to those in FIG. 7 and thereby descriptions of those are omitted.

At step S15, the channel zapping operation prediction section 203c predicts the next channel zapping operation. Then, excluding the currently viewed content, the viewing target prediction section 205c selects a content having the highest possibility of being a viewing target subsequent to the content selected in the past (step S72). It should be noted that, when step S72 is the first to be executed, the viewing target prediction section 205c selects a content having the highest possibility of being a viewing target.

Next, the read-ahead target judgment section 212 judges whether the load time of the certain content is equal to or greater than a threshold (step S73). This threshold is similar to the threshold at step S41 in FIG. 19.

When the load time is shorter than the threshold (No at step S73), the process at step S72 is executed. Furthermore, when the load time is longer than the threshold (Yes at step S73), the read-ahead execution section 206 starts a content read-ahead for the selected content (step S74). The operations subsequent to step S74 are identical to those in FIG. 19.

Figure 31:
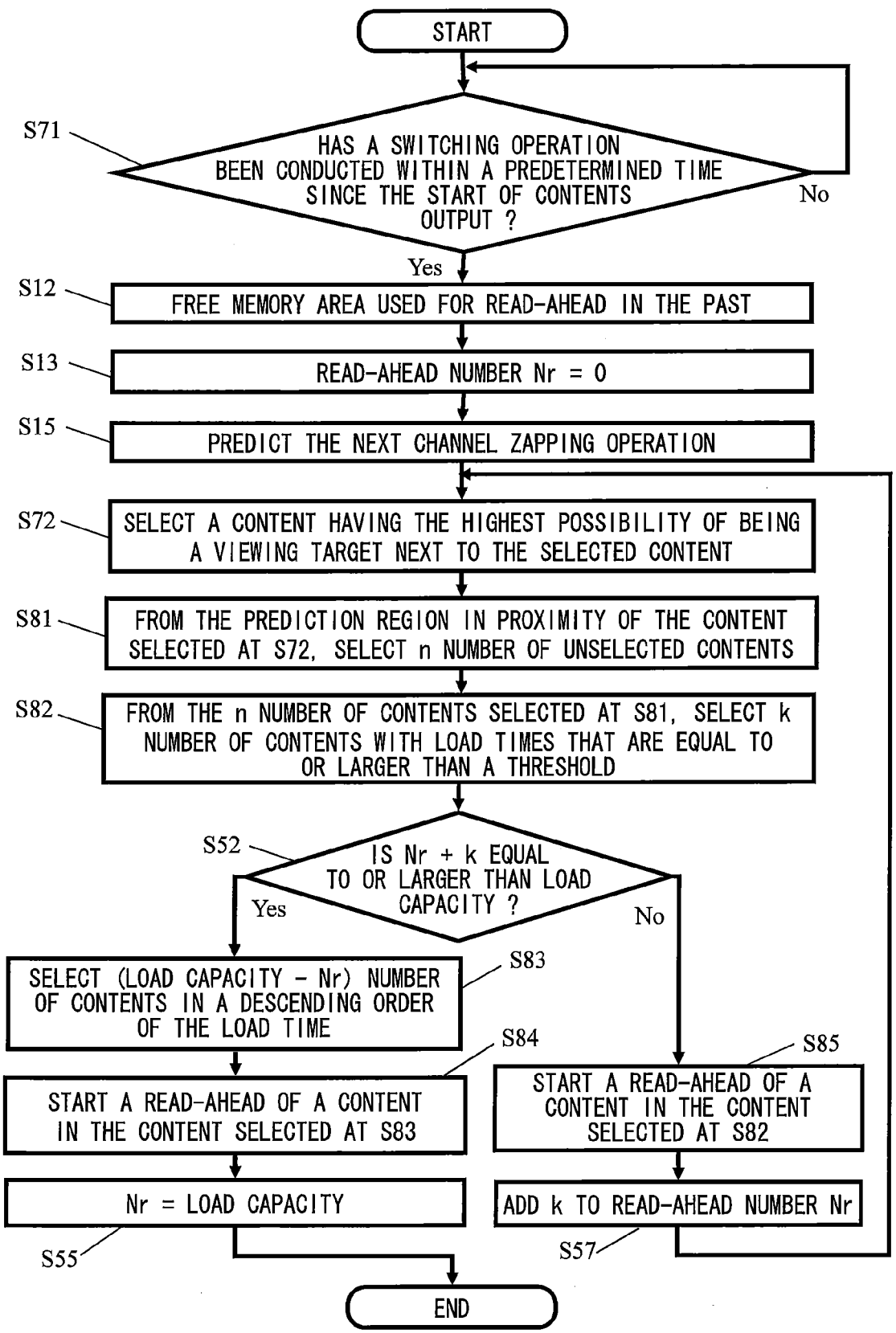
FIG. 31 is a flowchart showing one example of operations of the contents read-ahead control device 200c when starting a read-ahead of video contents.

FIG. 31 is a flowchart showing one example of operations of the contents read-ahead control device 200c of the third embodiment, in which improvements have been made with regard to a deviation of a channel zapping operation by the user. In FIG. 31, operations that are identical to those in FIG. 20 and FIG. 30 are given identical reference characters, and thereby descriptions of those are omitted. In the following, operations that are different from those in FIG. 20 and FIG. 30 are described in detail.

When the viewing target prediction section 205c selects a content at step S72, a prediction region is set around the content, and, among contents within the prediction region, the viewing target prediction section 205c selects a content that has not been selected yet (step S81). Details of this prediction region will be described later. In the following description, the number of contents selected at step S81 is represented as n.

Then, based on the contents attributes of the n number of contents, the read-ahead target judgment section 212 refers to the contents attribute table 211 and acquires load times. Next, among the n number of contents, a content having a load time equal to or longer than a threshold is selected (step S82). This threshold is identical to the threshold at step S51 in FIG. 20. In the following description, the number of contents selected at step S82 is represented as k.

When the viewing target prediction section 205c judges that Nr+k is equal to or more than the load capacity (Yes at step S52), the read-ahead target judgment section 212 executes the process at step S83. Next, among the k number of contents selected at step S82, the read-ahead target judgment section 212 selects (load capacity−Nr) number of contents in a descending order of the load time (step S83). Then, the read-ahead execution section 206 starts a content read-ahead of the contents selected at step S83 (step S84). The subsequent processes are identical to those in FIG. 20.

Next, when the viewing target prediction section 205c judges that Nr+k is smaller than the load capacity (No at step S52), the read-ahead execution section 206 executes the process at step S85. Then, the read-ahead execution section 206 starts a content read-ahead for the k number of contents selected at step S82 (step S85). The subsequent processes are identical to those in FIG. 20.

Figure 32:
FIG. 32 shows a specific example for describing contents of operations subsequent to step S72 in FIG. 30.

Next, contents of operations subsequent to step S72 in FIG. 30 are described by using a specific example in FIG. 32. In FIG. 32, descriptions are given by using a contents map that is represented as a two-dimensional plane of seven squares× seven squares. In addition, at step S15 in FIG. 30, the prediction result shown in FIG. 29 is obtained, and the currently viewed channel is channel C14 (the displayed content is C14[1]). Furthermore, the load capacity at step S19 in FIG. 30 is 3. In addition, the contents attribute table 211 that is referred at step S73 in FIG. 30 is that shown in FIG. 18, and the threshold at step S73 is 30 ms. Furthermore, the contents attributes of all the contents in channels C11, C13, and C16 are "streaming (outside home)". In addition, the contents attributes of all the contents in channels C12 and C15 are "broadcast". Furthermore, the contents attributes of all the contents in channels C14 and C17 are "file".

At step S72, the viewing target prediction section 205c recognizes from the prediction result in FIG. 29 that a channel zapping operation having the highest appearance probability is a channel switching for a number of "−2" with a content switching for a number of "+2". Then, the viewing target prediction section 205c selects C12[1], which is indicated by a thick boundary line in FIG. 32, as a content having the highest possibility of being the viewing target.

Next, at step S73, the read-ahead target judgment section 212 refers to the contents attribute table 211 in FIG. 18 and acquires a load time (200 ms), since the contents attribute of C12[1] selected at step S72 is "broadcast". Then, since this load time is equal to or longer than the threshold of 30 ms, the read-ahead target judgment section 212 makes a judgment of "Yes" at step S73.

In addition, at step S74, the read-ahead execution section 206 starts a read-ahead of a content in C12[1]. Then, at step S18, the read-ahead execution section 206 adds 1 to the read-ahead number Nr. Here, since the value of Nr is set to 0 at step S13, Nr=1 is derived. Since this Nr is less than the load capacity of 3, the read-ahead execution section 206 makes a judgment of "No" at step S19.

Next, returning to step S72, the viewing target prediction section 205c recognizes from the prediction result in FIG. 29 that a channel zapping operation having the second highest appearance probability is a channel switching for a number of "+2" with a content switching for a number of "−2". Therefore, the viewing target prediction section 205c selects C16[4], which is shown in FIG. 32 with a thick boundary line, as a channel having a high possibility of being the next viewing target among the channels that have not been selected yet.

Next, at step S73, the read-ahead target judgment section 212 recognizes that the contents attribute of C16[4] selected at step S72 is "streaming (outside home)". Then, the read-ahead target judgment section 212 refers to the contents attribute table 211 in FIG. 18 and acquires a load time (3000 ms). Then, since this load time is equal to or longer than the threshold of 30 ms, the read-ahead target judgment section 212 makes a judgment of "Yes" at step S73.

In addition, at step S74, the read-ahead execution section 206 starts a read-ahead of a content in C16[4]. Then, at step S18, the read-ahead execution section 206 adds 1 to the read-ahead number Nr to derive Nr=2. Since this Nr is less than the load capacity of 3, the read-ahead execution section 206 makes a judgment of "No" at step S19.

Next, returning to step S72 again, the viewing target prediction section 205c recognizes from FIG. 29 that a channel zapping operation having the third highest appearance probability is a channel switching for a number of "+3" with a content switching for a number of "+3". Therefore, the viewing target prediction section 205c selects C17[1], which is shown in FIG. 32 with a thick boundary line, as a channel having a high possibility of being the next viewing target among the channels that have not been selected yet.

Next, at step S73, the read-ahead target judgment section 212 refers to the contents attribute table 211 in FIG. 18 and acquires a load time (0 ms), since the contents attribute of C17[1] selected at step S72 is "file". Then, since this load time is shorter than the threshold of 30 ms, the read-ahead target judgment section 212 makes a judgment of "No" at step S73.

Thus, returning to step S72 again, the viewing target prediction section 205c recognizes from FIG. 29 that a channel zapping operation having the fourth highest appearance probability is a channel switching for a number of "−3" with a content switching for a number of "−1". Therefore, the viewing target prediction section 205c selects C11[7], which is shown in FIG. 30 with a thick boundary line, as a channel having a high possibility of being the next viewing target among the channels that have not been selected yet.

Next, at step S73, the read-ahead target judgment section 212 recognizes that the contents attribute of C11[7] selected at step S72 is "streaming (outside home)". Then, the read-ahead target judgment section 212 refers to the contents attribute table 211 in FIG. 18 and acquires a load time (3000 ms). Furthermore, since this load time is equal to or longer than the threshold of 30 ms, the read-ahead target judgment section 212 makes a judgment of "Yes" at step S73.

In addition, at step S74, the read-ahead execution section 206 starts a read-ahead of a content in C11[7] selected at step S72. Then, at step S18, the read-ahead execution section 206 adds 1 to the read-ahead number Nr to derive Nr=3. Since this Nr matches the load capacity of 3, the read-ahead execution section 206 makes a judgment of "Yes" at step S19, and the operation ends.

Next, details of contents of operations subsequent to step S72 in FIG. 31 are described by using specific examples shown in FIG. 33 to FIG. 36. These specific examples will be described by using the contents map which is shown in FIG. 26 and which is represented as a two-dimensional plane of seven squares×seven squares. Furthermore, in these specific examples, at step S15 in FIG. 31, the prediction result shown in FIG. 29 is obtained, and the currently viewed channel is channel C14 (the displayed content is C14[1]). Furthermore, the load capacity in steps subsequent to step S52 in FIG. 31 is 5. In addition, the contents attribute table 211 that is referred to at step S82 and step S83 in FIG. 31 is that shown in FIG. 18, and the threshold at step S82 is 30 ms. Furthermore, the contents attributes of all the contents in channels C11, C13 and C16 are streaming (outside home). In addition, the contents attribute of all the contents in channels C12 and C15 are broadcast. Furthermore, the contents attributes of all the contents in channels C14 and C17 are file.

Figure 35:
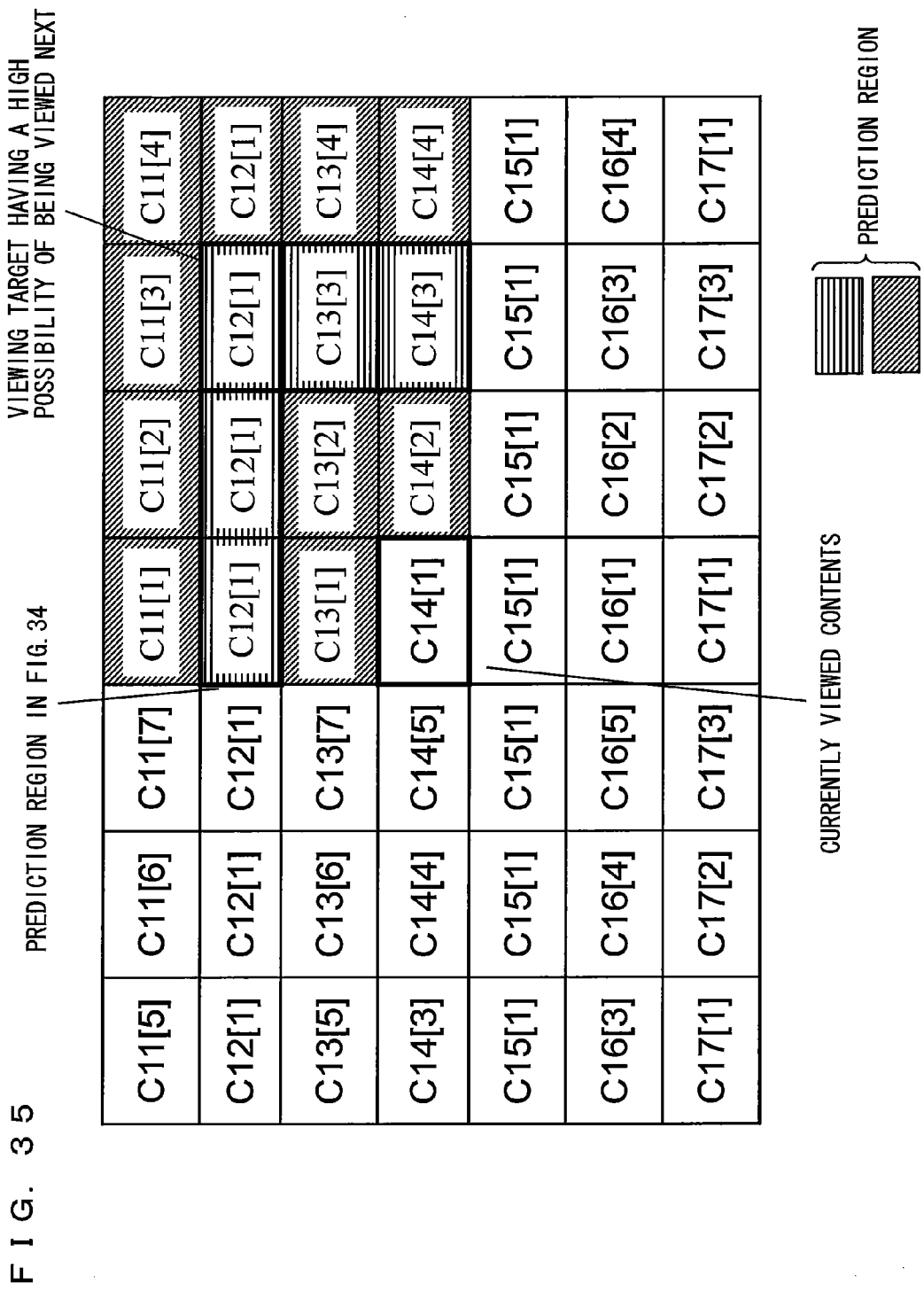
FIG. 35 shows one example indicating a prediction region determined by the viewing target prediction section 205c.

From the prediction result in FIG. 29, the viewing target prediction section 205c recognizes that a channel zapping operation having the highest appearance probability is a channel switching for a number of "−2" with a content switching for a number of "+2". Then, at step S72, the viewing target prediction section 205c selects C12[1], which is shown in FIG. 33 to FIG. 35 with thick boundary lines, as a content having the highest possibility of being the next viewing target.

Next, at step S81 the viewing target prediction section 205c determines a prediction region around C12[1] which is selected at step S72. FIG. 33 to FIG. 35 show examples indicating the prediction region.

In FIG. 33, contents, whose difference from the content selected at step S72 with regard to the number of channel switching or the number of content switching is equal to or less than a threshold (the threshold in the example shown in the figure is 1), are included in the prediction region. An optimum value may be determined as the threshold in advance in accordance with the contents output apparatus 100c.

In FIG. 34, the prediction region is an area described below including the content selected at step S72. In the following descriptions, represented as (s, t) is a content that is switched-on when a content switching for a number of s ($-Mmax \leq s \leq \pm Mmax$) and a channel switching for a number of t ($-Nmax \leq t \leq +Nmax$) are conducted on the contents map from the viewed content. It should be noted that, s and t are integers, and plus and minus reference characters are based on the descriptions for FIG. 29. When the content selected at step S72 is represented as (i, j), the prediction region is a union of the following set A and set B.

A={(i, m): m includes all the integers from 0 to j}
B={(n, j): n includes all the integers from 0 to i}

Here, in FIG. 34, the currently viewed content is C14[1]. Furthermore, this case results in i=+2 and j=-2. Therefore, the contents corresponding to set A are C12[1] which is (+2, -2) (indicated in the figure with a thick boundary line), C13[3] which is (+2, -1) (indicated as being hatched in the figure), and C14[3] which is (+2, 0) (indicated as being hatched in the figure). Furthermore, the contents corresponding to set B are three C12[1] which are (0, -2), (+1, -2), and (+2, -2) (indicated as being hatched in the figure). Therefore, the prediction region in FIG. 34 includes five contents that are hatched.

In FIG. 35, a prediction region is defined as an area obtained by setting a certain width (one example in which the size of the width is one is shown in the figure) inside and outside the prediction region determined by the method for FIG. 34 (area with horizontal stripes in the figure). An optimum value may be determined in advance as the size of the width, in accordance with the contents output apparatus 100c. Furthermore, the prediction region may be an area obtained by adding, to the prediction region determined by the method of FIG. 34, only either the inside or the outside of the prediction region determined by the method of FIG. 34.

It should be noted that, the prediction region shown in FIG. 33 to FIG. 35 are merely examples, and any area may be used as long as the area around the content selected at step S72 is used as the prediction region. Contents of processes will be described in the following under an assumption that the prediction region determined at step S81 is the one shown in FIG. 34.

Since all the contents in the prediction region in FIG. 34 are contents that are not currently viewed and that have not been selected yet, the viewing target prediction section 205c selects all of C12[1], C13[3], and C14[3] at step S81.

Next, at step S82, the read-ahead target judgment section 212 recognizes that the contents attributes of C12[1], C13[3], and C14[3] selected at step S81 are respectively "broadcast", "streaming (outside home)", and "file". Then, the read-ahead target judgment section 212 refers to the contents attribute table 211 in FIG. 18 and acquires respective load times (200 ms, 3000 ms, and 0 ms). Furthermore, the read-ahead target judgment section 212 selects C12[1] and C13[3] which have load times equal to or longer than the threshold of 30 ms. Therefore, the value k at step S82 becomes 2.

In addition, at step S52, the viewing target prediction section 205c calculates the value of Nr+k. Here, since the value of Nr is set to 0 at step S13, Nr+k=2 is derived and Nr+k will be less than the load capacity of 5. Therefore, the viewing target prediction section 205c makes a judgment of "No" at step S52.

Then, at step S85, the read-ahead execution section 206 starts a read-ahead for contents in C12[1] and C13[3] selected at step S82. Next, at step S57, the read-ahead execution section 206 adds 2 to Nr.

Next, returning to step S72, the viewing target prediction section 205c recognizes from FIG. 29 that a channel zapping operation having the second highest appearance probability is a channel switching for a number of "+2" with a content switching for a number of "-2". Therefore, the viewing target prediction section 205c selects C16[4], which is shown in FIG. 36 with a thick boundary line, as a content having a high possibility of being the viewing target next to the already selected C12[1].

In addition, at step S81, among the contents in the prediction region shown in FIG. 36, the viewing target prediction section 205c selects C14[4], C15[1], C16[4], C16[5], and C16[1], which have not been selected yet.

Next, at step S82, the read-ahead target judgment section 212 recognizes that the contents attributes of C14[4], C15[1], C16[4], C16[5], and C16[1] selected at step S81 are respectively "file", "broadcast", "streaming (outside home)", "streaming (outside home)", and "streaming (outside home)". Then, the read-ahead target judgment section 212 refers to the contents attribute table 211 in FIG. 18 and acquires respective load times (0 ms, 200 ms, 3000 ms, 3000 ms, and 3000 ms). Furthermore, the read-ahead target judgment section 212 selects C15[1], C16[4], C16[5], and C16[1] which have load times equal to or longer than the threshold of 30 ms. Therefore, the value k at step S82 becomes 4.

Then, at step S52, Nr+k=6 is derived, and since this is larger than the load capacity, the viewing target prediction section 205c makes a judgment of "Yes".

Then, at step S83, the read-ahead target judgment section 212 selects (load capacity−Nr) number of channels, i.e., three channels, in a descending order of the load time. Here, the viewing target prediction section 205c selects C16[4], C16[5], and C16[1], since C16[4], C16[5], and C16[1] have longer load times.

Next, at step S84, the read-ahead execution section 206 starts a read-ahead of contents in C16[4], C16[5], and C16[1] selected at step S83. Then, at step S55, the read-ahead execution section 206 changes Nr to the load capacity of 5. Then, the contents read-ahead operation ends.

In addition to the operations of the contents read-ahead control device according to the second embodiment, by using the contents read-ahead control device according to the third embodiment, the user can conduct a channel zapping in two dimensions by key operations of upward, downward, leftward, rightward, and the like. Therefore, by conducting a channel zapping operation, the user may suddenly switch to a content that cannot be accessed unless a large number of operations are conducted by key inputs such as upward, downward, leftward, and rightward from the currently viewed content. In such a case, the present contents read-ahead control device can predict a content having a high possibility of being viewed next by the user. Therefore, the contents output apparatus including the present contents read-ahead control device allows shortening the time before an output of contents starts.

In addition, in the present embodiment, as a result of predicting a channel zapping operation by the user by utilizing the prediction regions shown in FIG. 33 to FIG. 35, the advantageous effect of conducting a read-ahead of contents can be exerted even when the channel zapping operation conducted by the user deviates from the prediction result for a certain degree.

It should be noted that, at step S83 in FIG. 31, when a plurality of contents having the same load time exist and when (load capacity−Nr) number of contents cannot be selected; the priority order of the contents is arbitrary set. For example, a content near the content selected at step S72 may be prioritized to be selected. Furthermore, the priority order may be determined in accordance with the user's preference or a degree of popularity.

The map generation section 114c may avoid newly generating the contents map 119c in accordance with the user's content switching operation or contents view status. Furthermore, instead of newly generating the contents map 119c based on the content switching operation or the contents view status, the map generation section 114c may generate only parts that have been changed in the contents map 119c. In such a case, the acquisition section 110c transmits the parts that have been changed in the contents map 119c to the output control section 150c and the contents read-ahead control device 200c. Then, the output control section 150c and the contents map retain section 204 of the contents read-ahead control device 200c newly generates the contents map 119c based on information of the parts changed in the contents map 119c.

When the contents map 119c is generated as described above, there may be a case where updating of the contents map 119c is not conducted by the time the read-ahead execution section 206 conducts a read-ahead on a content as at step S17 in FIG. 19, at step S54 at FIG. 20, and the like. In such a case, although a content may exist in the contents map 119c, the content will not exist in reality. For such a case, instead of proceeding with the read-ahead, the read-ahead execution section 206 may conduct a read-ahead on the next content.

Similar to the first embodiment, it should be noted that the channel zapping operation prediction section 203c may operate to acquire a history of channel zappings conducted at the same time zone (morning, around noon, daytime, evening, or night) or the same day of the week to which the current time belongs, and may obtain the prediction result as shown in FIG. 29 from this history. In addition, the channel zapping operation prediction section 203c may obtain the prediction result as shown in FIG. 29 by referring only to the history of the user who is currently viewing. Furthermore, with regard to the prediction result obtained by the channel zapping operation prediction section 203c, other than the probability as shown in FIG. 29, statistics such as average values and medians may be calculated to be used as prediction results. Alternatively, the channel zapping operation prediction section 203c may predict a channel zapping operation having the highest possibility of being conducted next based on a tendency of changes in the past to present channel zapping operations.

For the first to third embodiments, FIG. 7, FIG. 8, FIG. 19, FIG. 20, FIG. 30, and FIG. 31 show examples of the operations of the contents read-ahead control devices 200, 200a, and 200c; and these operations have the following two characteristics. (1) In the operations at steps S11 and S71, it is judged whether there are no switch operations conducted within a predetermined time after an output of a content, in other words, it is judged whether or not the user has started viewing a content. Next, in the operations subsequent to steps S11 and S71, a read-ahead of contents is conducted at a necessary minimum level, by conducting a read-ahead of a content when the user starts viewing. (2) The operations at steps S18, S19, S22 to S25, S27, S52 to S55, S57, S83, and S84 allows exerting, to the utmost extent, the advantageous effect of conducting a read-ahead, by conducting a read-ahead of contents as many numbers as possible up to the load capacity.

However, instead of (1), when a read-ahead of contents is conducted periodically, the operation judgment sections 201 and 201c may avoid conducting the operations at steps S11 and S71. Furthermore, in FIG. 7, FIG. 19, and FIG. 30, instead of (2), when a read-ahead of only a single content is conducted by a single contents read-ahead operation, the read-ahead execution section 206 may avoid conducting the operations at steps S18 and S19. In addition, in FIG. 8, instead of (2), when the contents read-ahead control device 200 conducts a read-ahead for only the n number of channels selected at step S21 by a single contents read-ahead operation, the following processes may be omitted. In such a case, the viewing target prediction section 205 may avoid conducting the operation at step S22, and the read-ahead execution section 206 may skip the operations at S23 to S25, and S27, and may end the read-ahead operation after the operation at step S26. Similarly, in FIG. 20, instead of (2), when the contents read-ahead control device 200a conducts a read-ahead for only the k number of channels selected at step S51 by a single contents read-ahead operation, the following processes may be omitted. In such a case, the viewing target prediction section 205a may avoid conducting the operation at step S52, and the read-ahead execution section 206 may skip the operations at S53 to S55, and S57, and may end the read-ahead operation after the operation at step S26. Furthermore, in FIG. 31, instead of (2), when the contents read-ahead control device 200c conducts a read-ahead for only the k number of channels selected at step S82 by a single contents read-ahead operation, the following processes may be omitted. In such a case, the viewing target prediction section 205c may avoid conducting the operation at step S52, and the read-ahead execution section 206 may skip the operations from S83 to S55 and the operation at S57, and may end the read-ahead operation after the operation at step S85.

Furthermore, for example, in FIG. 7, when the contents read-ahead control device 200 periodically conducts a read-ahead operation for only a single content at a time, three steps of steps S15 to S17 may be executed as shown in FIG. 37.

It should be noted that, although the map generation section generates the contents map from the electronic program guide or reproduction list in the first to third embodiments, the map generation section may change the contents map based on a channel zapping operation history of the user. For example, when a content on the contents map predicted to be reached next by the user is anticipated to be a streamed video content from the channel zapping history of the user, the map generation section may switch the streamed video content on the contents map with a content that does not use a network resource. Furthermore, based on a history of channel zapping operations by the user, the map generation section may substitute, in a descending order of those having high probabilities of being reached next by the user, contents on the contents map with file reproductions which have short load times. In addition, the map generation section may also substitute contents in the periphery of the above described contents with file reproductions which have short load times.

INDUSTRIAL APPLICABILITY

A contents output apparatus including a contents read-ahead control device according to the present invention has a function of shortening the time required for switching a content when a channel zapping operation is conducted, and is useful for various instruments including a display function such as televisions, digital recorder devices, mobile phones, digital cameras, and personal computers.

DESCRIPTION OF THE REFERENCE CHARACTERS 100, 100a, 100c contents output apparatus
110, 110a, 110c acquisition section
111 broadcast reception section
112, 112c communication-interface section
113, 113c storage medium access section
114, 114a, 114c map generation section
119, 119c contents map
120 input section
121 user operation information
130 storage section
140 output section
150, 150c output control section
200, 200a, 200b, 200c contents read-ahead control device
201, 201c operation judgment section
202, 202c channel zapping operation history storage section
203, 203c channel zapping operation prediction section
204 contents map retain section
205, 205a, 205c viewing target prediction section
206 read-ahead execution section
211 contents attribute table
212 read-ahead target judgment section
213 external factor acquisition section
300 network
400 media server

The invention claimed is:

1. A contents read-ahead control device included in a contents output apparatus which outputs contents, the contents read-ahead control device comprising:
a contents map retain section which stores a contents map having described therein a sequential order in which the contents are switched by a specific user operation;
an operation judgment section which judges, based on the specific user operation, a channel zapping operation of continuously switching the contents;
a channel zapping operation history storage section which cumulatively stores the channel zapping operation judged by the operation judgment section;
a channel zapping operation prediction section which predicts a channel zapping operation that will be conducted next, based on a history of a plurality of channel zapping operations stored in the channel zapping operation history storage section;
a viewing target prediction section which predicts at least one viewing-target content that will be viewed next by a user, based on the contents map and the channel zapping operation that is predicted by the channel zapping operation prediction section as to be conducted next; and
a read-ahead execution section which conducts a read-ahead on the at least one viewing-target content predicted by the viewing target prediction section.

2. The contents read-ahead control device according to claim 1, wherein the viewing target prediction section predicts a content that has the highest possibility of being viewed next by the user and a content that is in proximity on the contents map to said content, based on the contents map and the channel zapping operation that will be conducted next.

3. The contents read-ahead control device according to claim 1, further comprising a contents attribute table which stores a necessary buffering time for each of the contents, wherein
the viewing target prediction section includes a read-ahead target judgment section which refers to the contents attribute table and selects, among the at least one viewing-target content, one part of the contents, based on the necessary buffering time, and
the read-ahead execution section conducts a read-ahead on the one part of the contents.

4. The contents read-ahead control device according to claim 3, wherein the read-ahead target judgment section selects, as the one part of the contents, a predetermined number of the contents from the at least one viewing-target content, in a descending order of the necessary buffering time.

5. The contents read-ahead control device according to claim 4, wherein the predetermined number is a possible maximum number of contents on which a read-ahead is conducted, determined based on a storage capacity of the contents output apparatus.

6. The contents read-ahead control device according to claim 3, further comprising an external factor acquisition section which periodically measures a data reception condition in a network, and which updates the necessary buffering time in the contents attribute table.

7. The contents read-ahead control device according to claim 1, wherein the contents map retain section acquires a contents map from a map generation section which is included in the contents output apparatus and which generates a contents map.

8. A contents read-ahead control method included in a contents output apparatus which outputs contents, the method comprising:
a channel zapping operation prediction step of predicting, based on a history of cumulatively stored channel zapping operations of continuous switching of the contents conducted by a user operation, a channel zapping operation that will be conducted next;
a viewing target prediction step of predicting at least one viewing-target content that will be viewed next by a user, based on a contents map having described therein a sequential order in which the contents are switched by a specific user operation and on the channel zapping operation that is predicted at the channel zapping operation prediction step as to be conducted next; and
a read-ahead execution step of conducting a read-ahead of the at least one viewing-target content predicted at the viewing target prediction step.

* * * * *